(12) United States Patent
Takahashi et al.

(10) Patent No.: US 11,143,762 B2
(45) Date of Patent: Oct. 12, 2021

(54) GNSS CORRECTION DATA DISTRIBUTION DEVICE, GNSS CORRECTION DATA DISTRIBUTION SYSTEM, AND GNSS CORRECTION DATA DISTRIBUTION METHOD

(71) Applicant: Panasonic Intellectual Property Management Co., Ltd., Osaka (JP)

(72) Inventors: Katsunao Takahashi, Osaka (JP); Masaharu Hirohata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 280 days.

(21) Appl. No.: 16/027,313

(22) Filed: Jul. 4, 2018

(65) Prior Publication Data
US 2018/0321387 A1 Nov. 8, 2018

Related U.S. Application Data

(63) Continuation of application No. PCT/JP2016/005188, filed on Dec. 20, 2016.

(30) Foreign Application Priority Data

Jan. 15, 2016 (JP) .............................. JP2016-006260

(51) Int. Cl.
*G01S 19/04* (2010.01)
*G01S 19/07* (2010.01)
(Continued)

(52) U.S. Cl.
CPC .............. *G01S 19/04* (2013.01); *G01S 19/07* (2013.01); *G01S 19/43* (2013.01); *G01S 19/05* (2013.01); *G01S 19/06* (2013.01)

(58) Field of Classification Search
CPC .......... G01S 19/04; G01S 19/06; G01S 19/07; G01S 19/43
(Continued)

(56) References Cited

U.S. PATENT DOCUMENTS 6,961,018 B2 * 11/2005 Heppe ..................... G01S 19/04
342/357.34
8,077,084 B2 * 12/2011 Syrjarinne .............. G01S 19/05
342/357.43
(Continued)

FOREIGN PATENT DOCUMENTS

| EP | 1857830 A2 | 11/2007 |
| JP | 2002-243833 A | 8/2002 |
| JP | 2004-170290 A | 6/2004 |

OTHER PUBLICATIONS

The Extended European Search Report dated Nov. 29, 2018 for the related European Patent Application No. 16884857.0.
(Continued)

*Primary Examiner* — Chuong P Nguyen
(74) *Attorney, Agent, or Firm* — Renner, Otto, Boisselle & Sklar, LLP

(57) ABSTRACT

GPS (Global Positioning System) correction data distribution device includes: first communicator that communicates with terminal device; second communicator that communicates with server; HDD (hard drive) that stores a database, the database having at least one coordinate and GPS correction data in association with each other; and manager that manages the database. Manager obtains GPS correction data from server with respect to the coordinate in the database, and updates the database while associating the coordinate with the GPS correction data. Manager refers to the database upon receipt of the GPS correction data distribution request from terminal device, extracts the GPS correction data of the coordinate corresponding to a position of the terminal
(Continued)

device, and distributes the extracted GPS correction data to terminal device.

10 Claims, 20 Drawing Sheets

(51) Int. Cl.
*G01S 19/43* (2010.01)
*G01S 19/06* (2010.01)
*G01S 19/05* (2010.01)

(58) Field of Classification Search
USPC ............ 342/357.41, 357.44, 357.26, 357.43
See application file for complete search history.

(56) References Cited

U.S. PATENT DOCUMENTS

| | | | | |
|---|---|---|---|---|
| 8,134,497 B2* | 3/2012 | Janky | ...................... | G01S 19/07 342/357.24 |
| 8,456,353 B2* | 6/2013 | Dai | ......................... | G01S 19/41 342/357.24 |
| 8,878,723 B2* | 11/2014 | Syrjarinne | .............. | G01S 19/06 342/357.42 |
| 9,116,228 B2* | 8/2015 | Ellum | ..................... | G01S 19/04 |
| 9,821,999 B2* | 11/2017 | Rudow | ................... | G01S 19/41 |
| 10,261,191 B2* | 4/2019 | Mundt | ..................... | G01S 19/07 |
| 2005/0110676 A1* | 5/2005 | Heppe | ..................... | G01S 19/07 342/357.34 |
| 2008/0122687 A1* | 5/2008 | Nelson | .................... | G01S 19/04 342/357.27 |
| 2008/0150796 A1* | 6/2008 | Syrjarinne | .............. | G01S 19/05 342/357.63 |
| 2012/0146847 A1* | 6/2012 | Janky | ..................... | G01S 19/07 342/357.23 |
| 2012/0295641 A1 | 11/2012 | Tsuda | | |
| 2013/0093618 A1* | 4/2013 | Oh | ........................ | G01S 5/0072 342/357.44 |
| 2014/0253374 A1 | 9/2014 | Tibout et al. | | |
| 2015/0009067 A1 | 1/2015 | Rudow et al. | | |
| 2015/0289097 A1 | 10/2015 | Rudow et al. | | |
| 2016/0291164 A1* | 10/2016 | Jordan | .................... | G01S 19/41 |
| 2020/0120578 A1* | 4/2020 | Shreevastav | .......... | H04W 48/10 |
| 2021/0116579 A1* | 4/2021 | Rezaei | ................... | G01S 19/25 |

OTHER PUBLICATIONS

International Search Report for corresponding App. No. PCT/JP2016/005188, dated Mar. 28, 2017.

Communication pursuant to Article 94(3) EPC dated Aug. 11, 2020 for the related European Patent Application No. 16884857.0.

* cited by examiner

FIG. 3

| First database | | 14_D |
|---|---|---|
| Coordinate | GPS correction data | ... |

FIG. 9
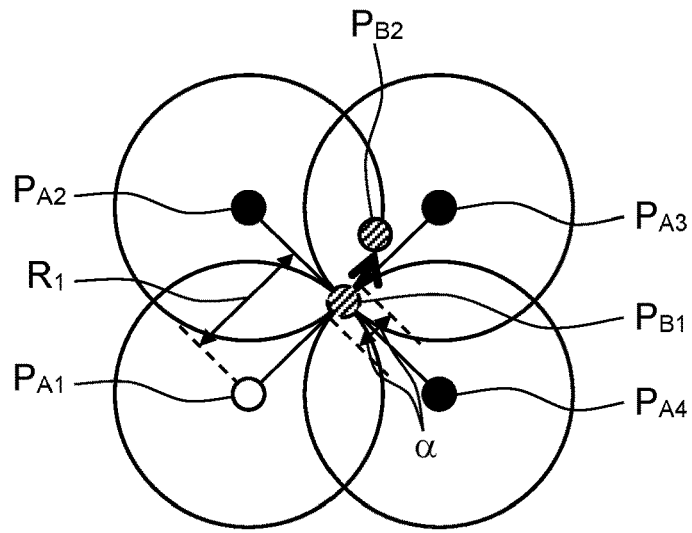
FIG. 10
First database
| Coordinate | GPS correction data | Presence or absence of distribution | ... |
14_D
FIG. 11
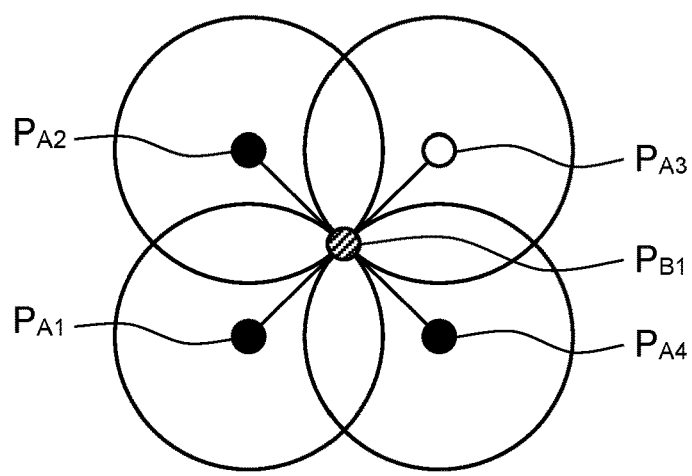

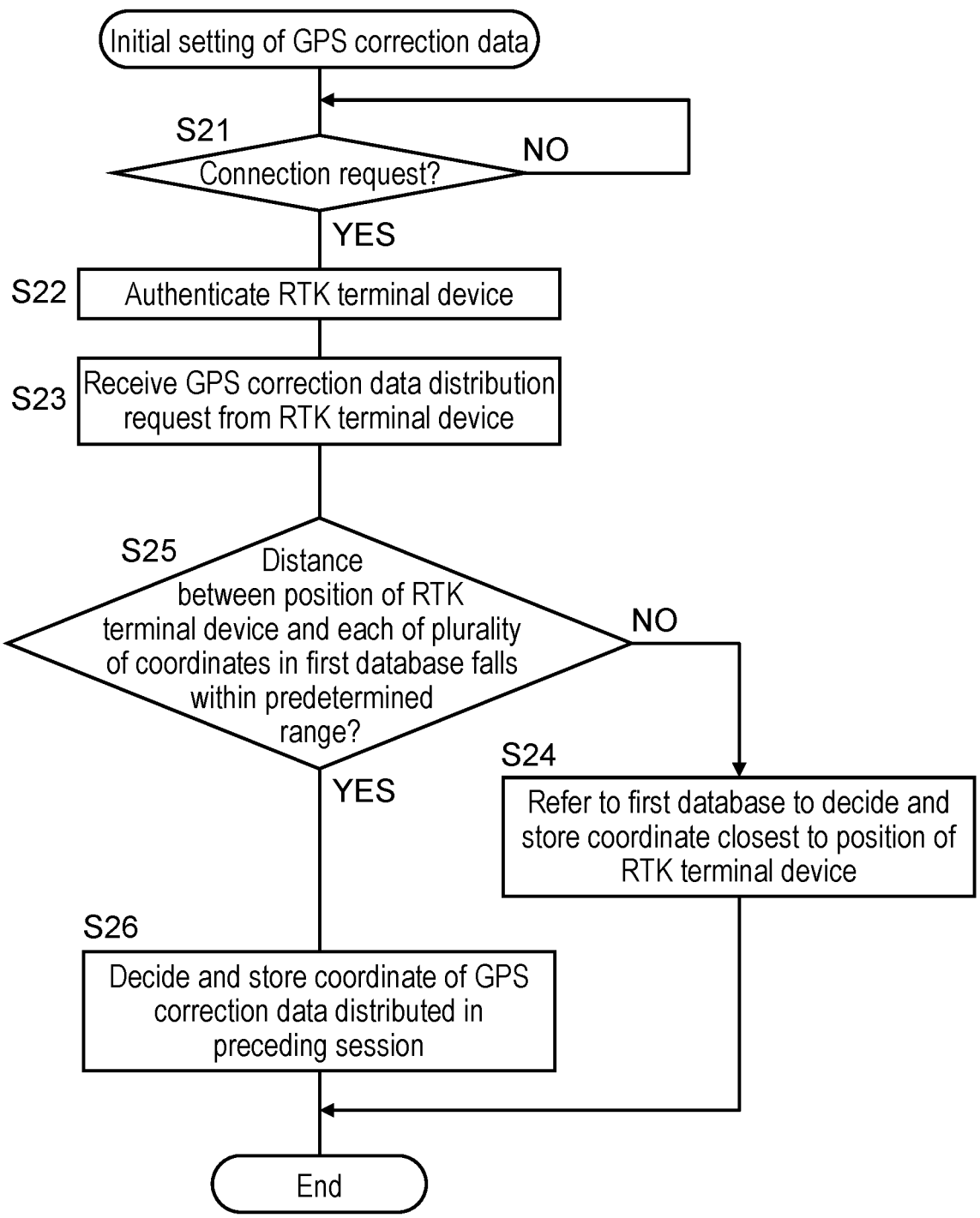

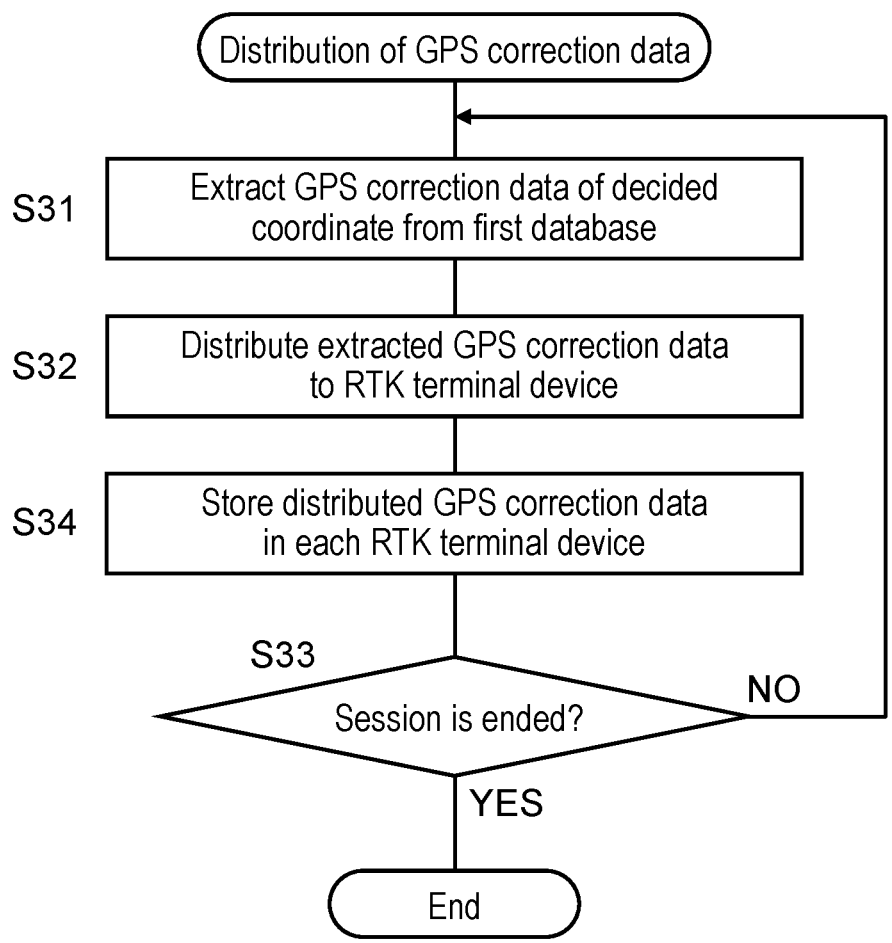

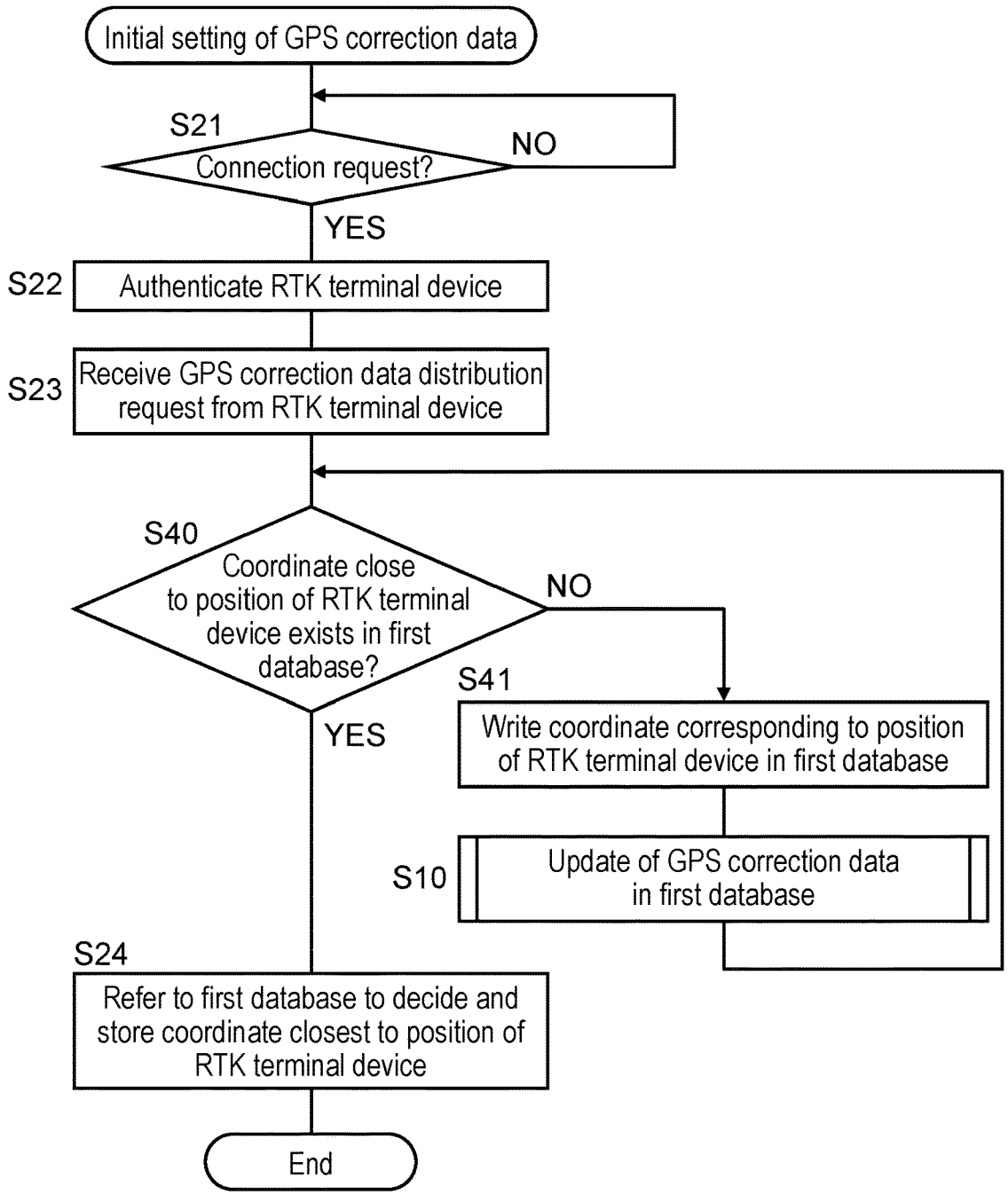

GNSS CORRECTION DATA DISTRIBUTION DEVICE, GNSS CORRECTION DATA DISTRIBUTION SYSTEM, AND GNSS CORRECTION DATA DISTRIBUTION METHOD

BACKGROUND

1. Technical Field

The present disclosure relates to a GNSS (Global Navigation Satellite System) correction data distribution device that distributes GNSS correction data to an RTK (Real Time Kinematic) terminal device, the RTK terminal device performing RTK positioning using a GNSS.

2. Description of Related Art

Examples of GNSS include a GPS (Global Positioning System) and a GLONASS (Global Navigation Satellite System). For example, an RTK positioning method is known as a high-accuracy positioning method in which the GPS is used. There is an RTK terminal device that performs high-accuracy positioning of an own position using the RTK positioning method. For example, the RTK terminal device receives a radio wave from a GPS satellite, and calculates a tentative position from radio-wave GPS coordinate information using an independent positioning method. Then, the RTK terminal device makes a request for GPS correction data related to the tentative position to a GPS correction data distribution service company, and obtains the GPS correction data from the GPS correction data distribution service company. Then, the RTK terminal device performs the high-accuracy positioning by performing an RTK arithmetic operation on phase information about the radio wave (carrier wave), which is included in the GPS correction data and received at a reference point, and phase information about the radio wave (carrier wave), which is received from the GPS satellite by the RTK terminal device.

The following two kinds of GPS correction data are known as the GPS correction data distributed by the GPS correction data distribution service company. The first GPS correction data is GPS correction data including coordinate information about a Real Reference Station (RRS) placed by Geographical Survey Institute and the phase information about the radio wave (carrier wave) received from the GPS satellite at the RRS. The second GPS correction data is GPS correction data including coordinate information and phase information about a Virtual Reference Station (VRS), which is set closer to a request position made by the RTK terminal device based on three appropriate RRSs close to the request position.

Unexamined Japanese Patent Publication No. 2004-170290 discloses a public survey system including a virtual reference data distribution station that provides the GPS correction data of the VRS and a survey mobile station that performs the high-accuracy positioning using the GPS correction data.

SUMMARY

A GNSS (Global Navigation Satellite System) correction data distribution device according to the present disclosure is a GNSS correction data distribution device that distributes GNSS correction data to a terminal device, the terminal device performing real time kinematic positioning using a GNSS, the GNSS correction data distribution device including: a first communicator that communicates with the terminal device; a second communicator that communicates with a GNSS correction data server; a storage that stores GNSS correction data information, the GNSS correction data information having at least one coordinate and GNSS correction data in association with each other; and a manager that manages the GNSS correction data information. The manager obtains the GNSS correction data from the GNSS correction data server through the second communicator with respect to the coordinate in the GNSS correction data information, and updates the GNSS correction data information while associating the coordinate with the GNSS correction data. Upon receipt of a GNSS correction data distribution request from the terminal device through the first communicator, the manager refers to the GNSS correction data information, extracts the GNSS correction data of the coordinate corresponding to a position of the terminal device, and distributes the extracted GNSS correction data to the terminal device.

In the GNSS correction data distribution device of the present disclosure, it is possible to shorten time necessary for the obtainment of the GNSS correction data since the terminal device makes the request for the GNSS correction data.

BRIEF DESCRIPTION OF DRAWINGS

FIG. 3 is a view illustrating a configuration of a first database in GPS correction data distribution device 10 according to a first exemplary embodiment.

FIG. 9 is a view illustrating an example of a relationship between the coordinate in the first database of GPS correction data distribution device 10 and the position of RTK terminal device 20, and is a view illustrating another problem.

FIG. 10 is a view illustrating a configuration of a first database in GPS correction data distribution device 10 according to a second exemplary embodiment.

FIG. 11 is a view illustrating an example of a relationship between the coordinate managed in the first database of GPS correction data distribution device 10 and the position of RTK terminal device 20, and is a view illustrating a solution to another problem.

FIG. 12 is a flowchart illustrating the operation to initially set the GPS correction data using GPS correction data distribution device 10 according to the second exemplary embodiment.

FIG. 13 is a flowchart illustrating the operation to distribute the GPS correction data using GPS correction data distribution device 10 according to the second exemplary embodiment.

FIG. 14 is a view illustrating a configuration of a second database in GPS correction data distribution device 10 according to the second exemplary embodiment.

FIG. 21 is a flowchart illustrating the operation to initially set the GPS correction data using GPS correction data distribution device 10 according to the third exemplary embodiment.

FIG. 22 is a view illustrating a configuration of the first database in GPS correction data distribution device 10 according to the third exemplary embodiment.

DETAILED DESCRIPTION

Hereinafter, exemplary embodiments will be described in detail with reference to the drawings as appropriate. However, sometimes detailed descriptions more than necessary will be omitted. For example, in some cases, detailed description of a well-known item and repeated description related to a substantially identical configuration will be omitted. These omissions are made to avoid unnecessary redundancy of the following description and to facilitate the understanding of those skilled in the art. Note that the inventors of the present disclosure provide the accompanying drawings and the following description in order to allow those skilled in the art to fully understand the present disclosure, and do not intend to limit the subject matter as described in the appended claims.

First Exemplary Embodiment

GPS correction data distribution system 1 of a first exemplary embodiment will be described below as an example of the GNSS correction data distribution system of the present disclosure with reference to FIGS. 1 to 8.

Figure 1:
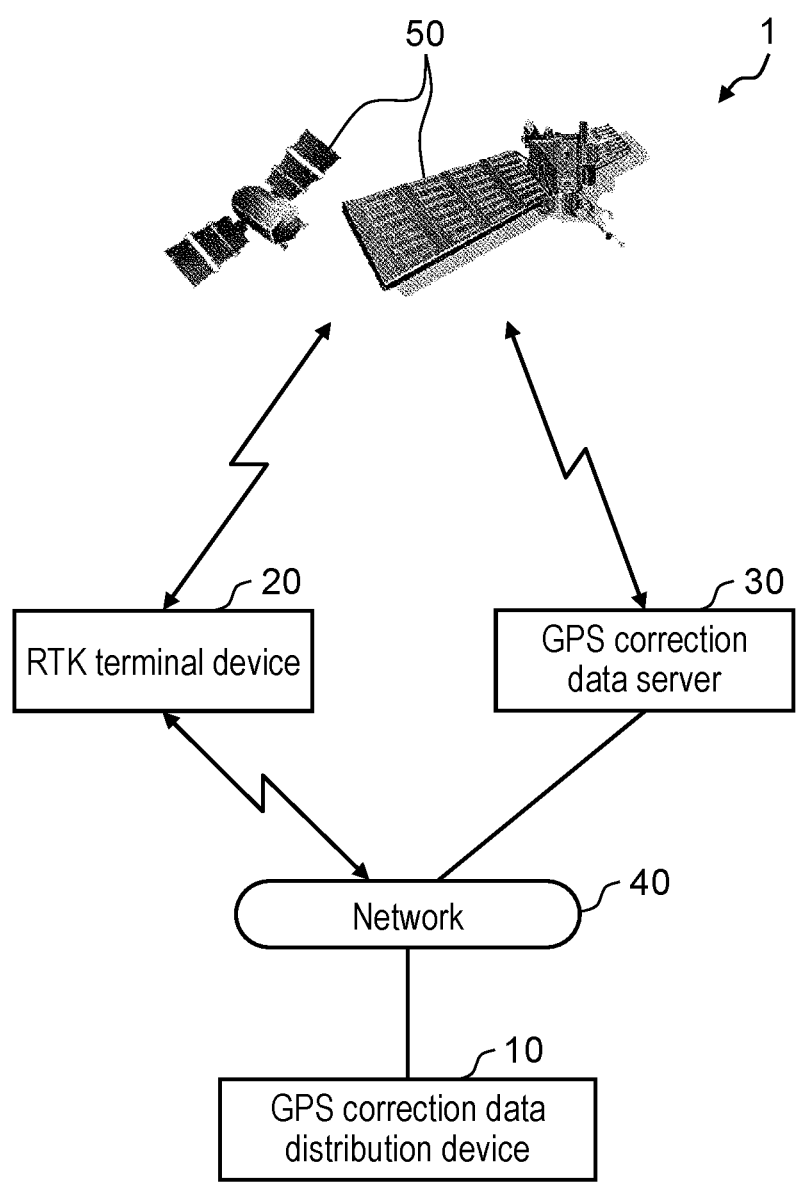
FIG. 1 is a view illustrating a configuration of GPS correction data distribution system 1 according to the present disclosure.

1-1. Configuration 1-1-1. Configuration of GPS Correction Data Distribution System FIG. 1 is a view illustrating a configuration of GPS correction data distribution system 1. GPS correction data distribution system 1 includes GPS correction data distribution device 10 (an example of the GNSS correction data distribution device), RTK terminal device 20, GPS correction data server 30 (an example of the GNSS correction data server), network 40, and GPS satellite 50 (an example of the GNSS satellite).

RTK terminal device 20 performs the RTK positioning using the GPS. For example, RTK terminal device 20 receives a radio wave from GPS satellite 50, and calculates a tentative position from radio-wave GPS coordinate information using the independent positioning method. Then, RTK terminal device 20 makes a request for GPS correction data (an example of the GNSS correction data) with respect to the tentative position to GPS correction data distribution device 10 through network 40 such as a WWAN (Wireless Wide Area Network) and the Internet, and obtains the GPS correction data from GPS correction data distribution device 10 through network 40. Then, RTK terminal device 20 performs high-accuracy positioning by performing an RTK arithmetic operation on phase information about the radio wave (carrier wave), which is included in the GPS correction data and received at a reference point, and phase information about the radio wave (carrier wave), which is received from GPS satellite by RTK terminal device 20.

GPS correction data server 30 is a server owned by a GPS correction data distribution service company. GPS correction data server 30 receives a GPS correction data distribution request (an example of the GNSS correction data distribution request) from GPS correction data distribution device 10 through network 40. The GPS correction data distribution request includes a coordinate of the GPS correction data to be distributed as a request position. GPS correction data server 30 distributes the GPS correction data including the coordinate information and the phase information about a Virtual Reference Station (VRS) corresponding to the request position to GPS correction data distribution device 10 through network 40. At this point, using the RTK arithmetic operation based on coordinate information about a Real Reference Station (RRS) closest to the request position or phase information about the radio wave (carrier wave) received from GPS satellite 50 by the RRS, GPS correction data server 30 obtains the GPS correction data including the coordinate information and phase information about the VRS corresponding to the request position.

GPS correction data distribution device 10 stores a database (an example of the GNSS correction data information) in which a predetermined coordinate and the GPS correction data obtained from GPS correction data server 30 through network 40 with respect to the coordinate. Upon receipt of the GPS correction data distribution request (an example of the GNSS correction data distribution request) from RTK terminal device 20, GPS correction data distribution device 10 refers to the database, extracts the GPS correction data of the coordinate closest to the position of RTK terminal device 20, the coordinate being included in the GPS correction data distribution request, and distributes the extracted GPS correction data to RTK terminal device 20.

1-1-2. Configuration of GPS Correction Data Distribution Device

Figure 2:
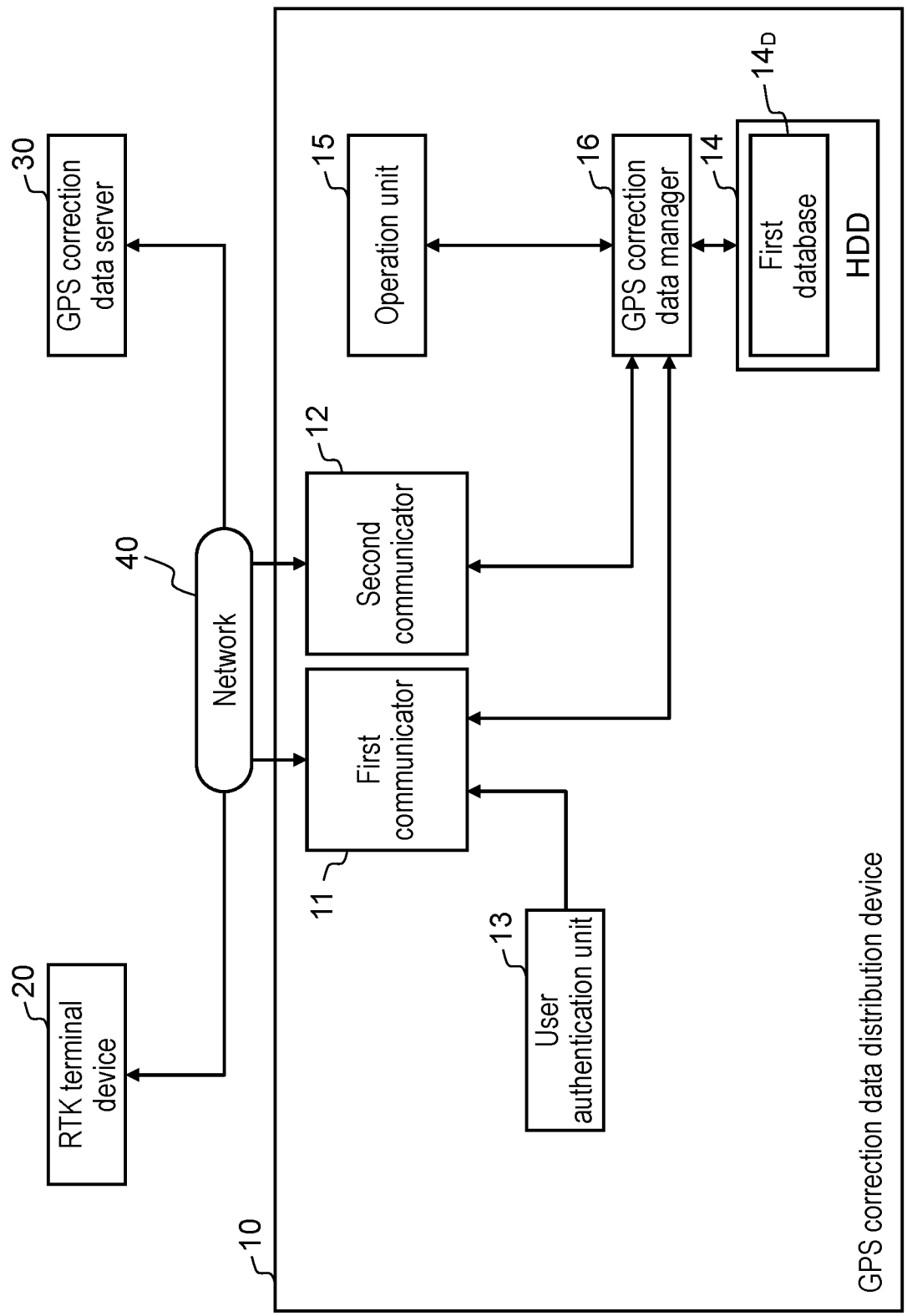
FIG. 2 is a block diagram illustrating a configuration of GPS correction data distribution device 10 according to the present disclosure.

FIG. 2 is a block diagram illustrating a configuration of GPS correction data distribution device 10. GPS correction data distribution device 10 includes first communicator 11, second communicator 12, user authentication unit 13, hard drive (HDD) 14, operation unit 15, and GPS correction data manager 16.

First communicator 11 is a communication module (circuit), which includes an interface and communicates with RTK terminal device 20 through network 40. Second communicator 12 is a communication module (circuit), which includes an interface and communicates with GPS correction data server 30 through network 40.

User authentication unit 13 authenticates RTK terminal device 20 in response to a connection request received from RTK terminal device 20 through first communicator 11.

HDD 14 is a recording medium in which various pieces of data and various programs are stored. HDD 14 stores first database (GPS correction data information) $14_D$ in which a predetermined coordinate and the GPS correction data of the coordinate are managed while in association with each other. Details of first database $14_D$ will be described later.

Operation unit 15 includes a display with which a user inputs information and performs various settings, a keyboard, a mouse, and a touch panel. Operation unit 15 displays the coordinate in first database $14_D$, and sets or changes the coordinate in first database $14_D$.

GPS correction data manager 16 manages first database $14_D$. GPS correction data manager 16 obtains the GPS correction data from GPS correction data server 30 through network 40 with respect to a predetermined coordinate in first database $14_D$. Upon receipt of the GPS correction data distribution request from RTK terminal device 20, GPS correction data manager 16 refers to first database $14_D$, extracts the GPS correction data of the coordinate closest to the position of RTK terminal device 20, the coordinate being included in the GPS correction data distribution request, and distributes the extracted GPS correction data to RTK terminal device 20.

For example, GPS correction data distribution device 10 can be achieved with a computer. In this case, first and second communicators 11, 12 can be achieved with a network interface, and user authentication unit 13 and GPS correction data manager 16 can be achieved with a Central Processing Unit (CPU) or a Micro-Processing Unit (MPU), which executes a program stored in a Read Only Memory (ROM) or a Random Access Memory (RAM).

FIG. 3 is a view illustrating a configuration of first database $14_D$ in GPS correction data distribution device 10 according to the first exemplary embodiment. As illustrated in FIG. 3, first database $14_D$ manages the coordinate and the GPS correction data while associating the coordinate and the GPS correction data with each other. For example, the coordinate includes pieces of information about latitude, longitude, and altitude. The GPS correction data may be data format RTCM3 received from GPS correction data server 30, or a data format into which data format RTCM3 is converted. First database $14_D$ may include other pieces of information.

1-2. Operation

Operations of GPS correction data distribution device 10 having the above configuration will be described below.

1-2-1. Outline of Operations

Figure 4A:
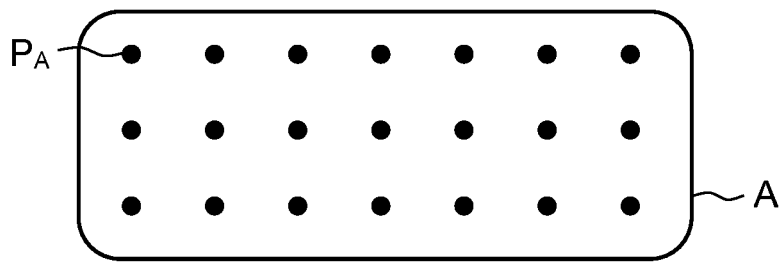
FIG. 4A is a view illustrating an example of a relationship between a coordinate managed in the first database of GPS correction data distribution device 10 according to the first exemplary embodiment and a GPS correction data distribution area.

FIG. 4A is a view illustrating an example of a relationship between coordinate $P_A$ managed in first database $14_D$ of GPS correction data distribution device 10 according to the first exemplary embodiment and GPS correction data distribution area A. Coordinates $P_A$ are two-dimensionally and regularly arranged at predetermined intervals in GPS correction data distribution area A of GPS correction data distribution device 10.

Figure 4B:
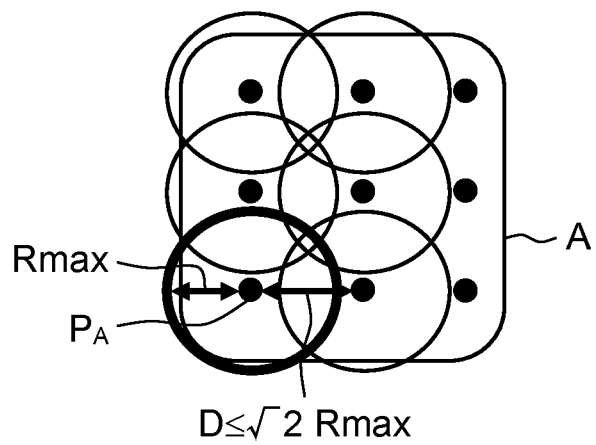
FIG. 4B is a view illustrating a method for deciding the coordinate managed in the first database of GPS correction data distribution device 10 according to the first exemplary embodiment.

At this point, the predetermined interval may be decided based on a maximum distance (for example, 5 km to 10 km) between the position of RTK terminal device 20 and the coordinate of the GPS correction data in performing the high-accuracy RTK positioning. FIG. 4B is a view illustrating a method for deciding coordinate $P_A$ managed in first database $14_D$ of GPS correction data distribution device 10 according to the first exemplary embodiment. As illustrated in FIG. 4B, assuming that Rmax is the maximum distance between the position of RTK terminal device 20 and the coordinate of the GPS correction data, interval D between the coordinates adjacent to each other is less than or equal to $\sqrt{(2)} \times$Rmax. Therefore, even if RTK terminal device 20 is located at any place in GPS correction data distribution area A, the high-accuracy RTK positioning can be performed using the GPS correction data of one of coordinates $P_A$. First database $14_D$ manages the GPS correction data with respect to each coordinate $P_A$ in FIG. 4A.

GPS correction data manager 16 makes a request for the GPS correction data to GPS correction data server 30 through second communicator 12 with respect to predetermined coordinate $P_A$ in first database $14_D$, and obtains the GPS correction data. Then, GPS correction data manager 16 updates first database $14_D$ while associating the obtained GPS correction data with coordinate $P_A$ of the GPS correction data. GPS correction data manager 16 periodically repeats the request and obtainment of the GPS correction data and the update of first database $14_D$ at predetermined time intervals (for example, at 1-second intervals).

Figure 4C:
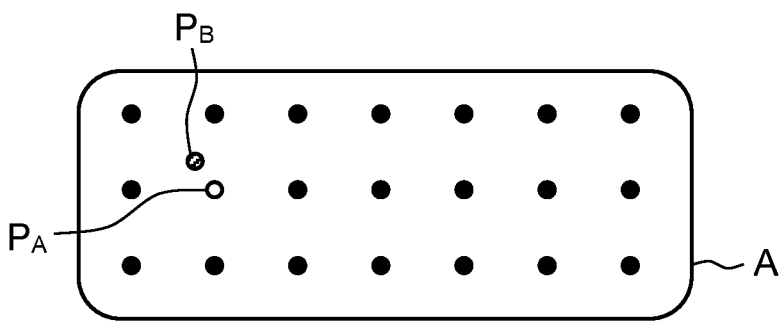
FIG. 4C is a view illustrating an example of a relationship between the coordinate managed in the first database of GPS correction data distribution device 10 according to the first exemplary embodiment and a position of an RTK terminal device.

Upon receipt of the GPS correction data distribution request from RTK terminal device 20 through first communicator 11, GPS correction data manager 16 refers to first database $14_D$ to decide the coordinate corresponding to the position of RTK terminal device 20, the coordinate being included in the GPS correction data distribution request, as the coordinate of the GPS correction data to be distributed. FIG. 4C is a view illustrating an example of a relationship between coordinate $P_A$ managed in first database $14_D$ of GPS correction data distribution device 10 according to the first exemplary embodiment and position $P_B$ of RTK terminal device 20. As illustrated in FIG. 4C, specifically, GPS correction data manager 16 decides coordinate $P_A$ closest to position $P_B$ of RTK terminal device 20 as the coordinate of the GPS correction data to be distributed (initial setting of the GPS correction data).

At this point, RTK terminal device 20 periodically transmits the GPS correction data distribution request at predetermined time intervals (for example, at 5-second intervals) in one session. The session indicates a state in which data communication can be established between GPS correction data manager 16 and RTK terminal device 20, and one session is a period from start to end of connection between GPS correction data distribution device 10 and RTK terminal device 20.

When the GPS correction data distribution request is initially received in one session, in other words, at the start of the session, GPS correction data manager 16 decides the coordinate of the GPS correction data to be distributed as described above, but GPS correction data manager 16 does not decide the coordinate of the GPS correction data to be distributed again even if the GPS correction data distribution request is periodically received in the identical session.

GPS correction data manager 16 refers to first database $14_D$, extracts the GPS correction data of the decided coordinate $P_A$, and distributes the extracted GPS correction data to RTK terminal device 20. GPS correction data manager 16 periodically repeats the extraction and distribution the GPS correction data at predetermined time intervals (for example, at 1-second intervals).

Figure 4D:
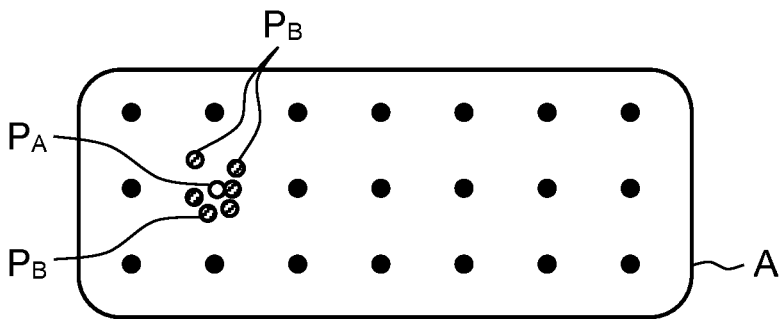
FIG. 4D is a view illustrating an example of a relationship between the coordinate managed in the first database of GPS correction data distribution device 10 according to the first exemplary embodiment and positions of a plurality of RTK terminal devices 20.

As illustrated in FIG. 4D, in the case where the identical coordinate closest to positions $P_B$ of a plurality of RTK terminal devices 20 exists, GPS correction data manager 16 can distribute the GPS correction data of identical coordinate $P_A$ to the plurality of RTK terminal devices 20.

GPS correction data distribution device 10 performs the setting of the coordinate in first database $14_D$, the update of the GPS correction data in first database $14_D$, the initial setting of the GPS correction data, and the distribution of the GPS correction data. Each of the operations will be described in detail below.

1-2-2. Setting of Coordinate in First Database

Figure 5:
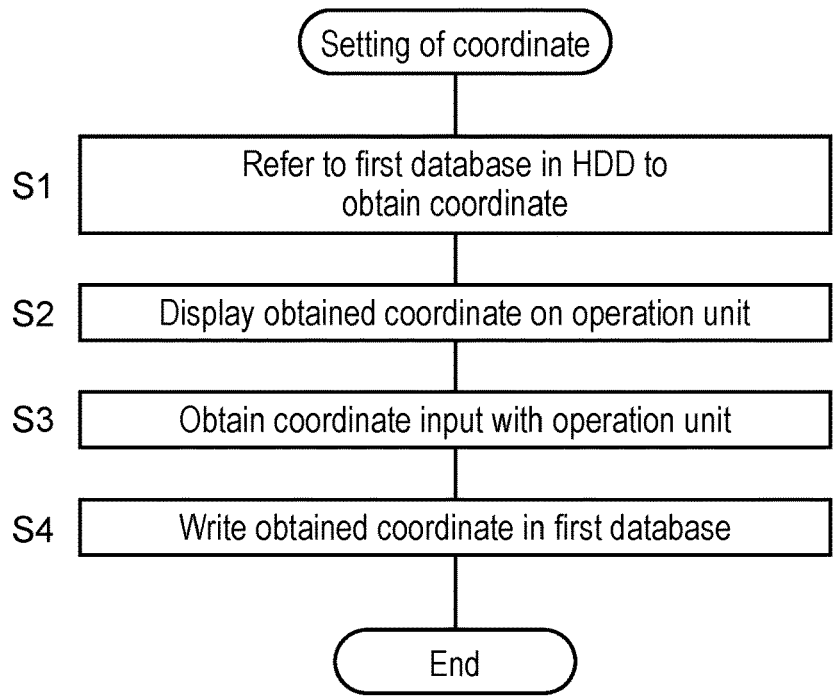
FIG. 5 is a flowchart illustrating an operation to set the coordinate managed in the first database of GPS correction data distribution device 10 according to the first exemplary embodiment.

FIG. 5 is a flowchart illustrating an operation to set the coordinate, which is managed by first database $14_D$ in GPS correction data distribution device 10 according to the first exemplary embodiment. The operation to set the coordinate in first database $14_D$ using GPS correction data distribution device 10 will be described with reference to the flowchart in FIG. 5. For example, the operation to set the coordinate in first database $14_D$ may be repeated after a predetermined period.

First, GPS correction data manager 16 refers to first database $14_D$ in HDD 14 to obtain the coordinate (S1), and displays the obtained coordinate on a display of operation unit 15 (S2). In the first setting, because the coordinate is not set to first database $14_D$, no coordinate is obtained in step S1, and the coordinate is not displayed in step S2. On the other hand, in the setting latter than the second setting, because the coordinate is displayed in step S2, a user can perform the following pieces of processing while checking the displayed coordinate.

Then, GPS correction data manager 16 obtains the coordinate input with a keyboard of operation unit 15 (S3), and writes the obtained coordinate in first database $14_D$ (S4).

1-2-3. Update of GPS Correction Data in First Database

Figure 6:
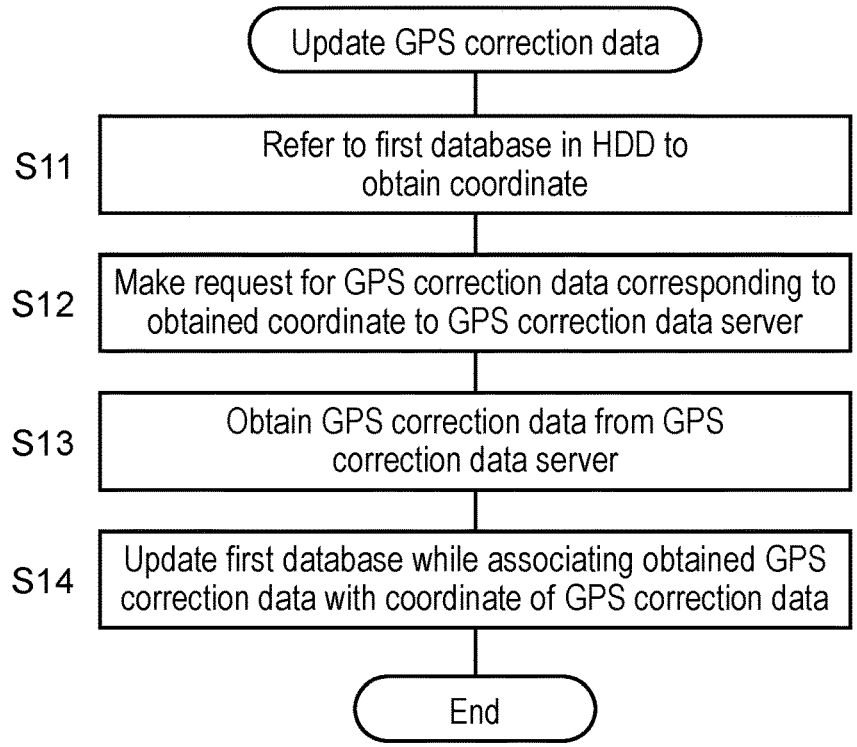
FIG. 6 is a flowchart illustrating an operation to update GPS correction data managed in the first database of GPS correction data distribution device 10 according to the first exemplary embodiment.

FIG. 6 is a flowchart illustrating an operation to update the GPS correction data managed in first database $14_D$ of GPS correction data distribution device 10 according to the first exemplary embodiment. The operation to update the GPS correction data in first database $14_D$ using GPS correction data distribution device 10 will be described with reference to the flowchart in FIG. 6.

First, GPS correction data manager 16 refers to first database $14_D$ in HDD 14 to obtain the coordinate (S11). Then, GPS correction data manager 16 designates the obtained coordinate, makes a request for the GPS correction data corresponding to the obtained coordinate to GPS correction data server 30 through second communicator 12 (S12), and obtains the GPS correction data from GPS correction data server 30 (S13). Then, GPS correction data manager 16 updates first database $14_D$ while associating the obtained GPS correction data with the coordinate of the GPS correction data (S14).

GPS correction data manager 16 periodically repeats the operations in steps S11 to S14 at predetermined time intervals (for example, at 1-second intervals). Therefore, the GPS correction data in first database $14_D$ always becomes the latest data.

1-2-4. Initial Setting of GPS Correction Data

Figure 7:
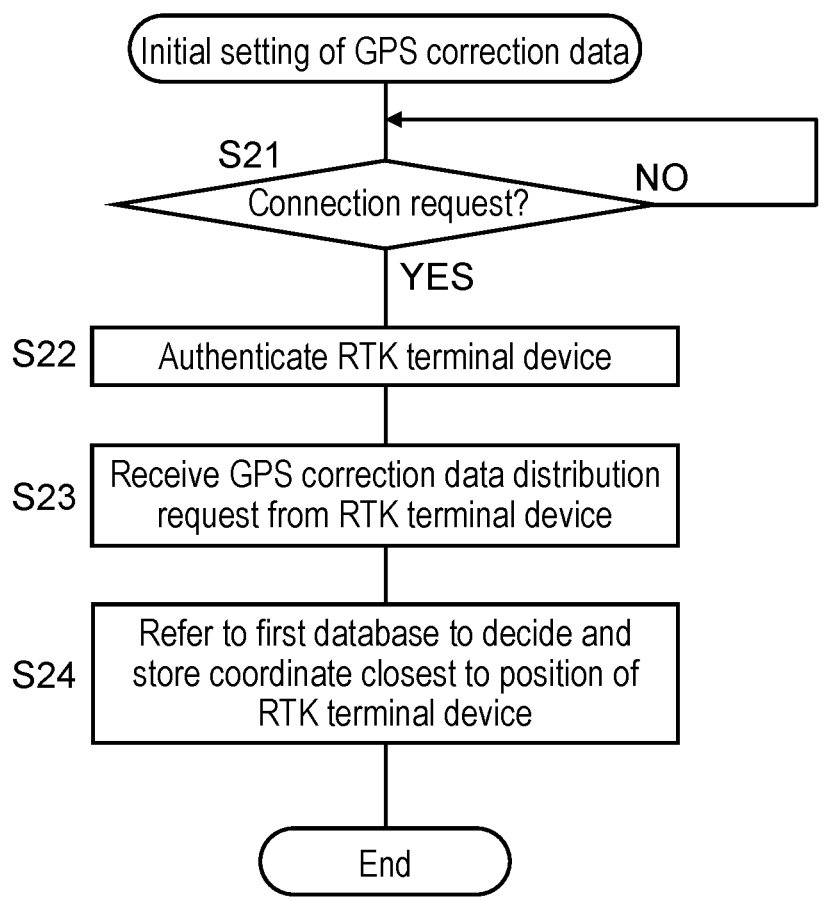
FIG. 7 is a flowchart illustrating an operation to initially set the GPS correction data using GPS correction data distribution device 10 according to the first exemplary embodiment.

FIG. 7 is a flowchart illustrating an operation to initially set the GPS correction data using GPS correction data distribution device 10 according to the first exemplary embodiment. The operation to initially set the GPS correction data using GPS correction data distribution device 10 will be described with reference to the flowchart in FIG. 7.

User authentication unit 13 determines whether a connection request is received from RTK terminal device 20 through first communicator 11 (S21). When the connection request is not received, the flow returns to step S21, and user authentication unit 13 repeats the determination processing.

When the connection request is received in step S21, user authentication unit 13 authenticates RTK terminal device 20 (S22). Then, GPS correction data manager 16 receives the GPS correction data distribution request from RTK terminal device 20 through first communicator 11 (S23). The GPS correction data distribution request received from RTK terminal device 20 includes positional information about RTK terminal device 20. Then, GPS correction data manager 16 refers to first database $14_D$, decides the coordinate closest to the position of RTK terminal device 20 designated by the distribution request as the coordinate of the GPS correction data to be distributed, and stores the coordinate closest to the position of RTK terminal device 20 (S24).

Thus, in the present exemplary embodiment, GPS correction data manager 16 initially sets the GPS correction data upon receipt of the GPS correction data distribution request from RTK terminal device 20, in other words, at the start of the session.

1-2-5. Distribution of GPS Correction Data

Figure 8:
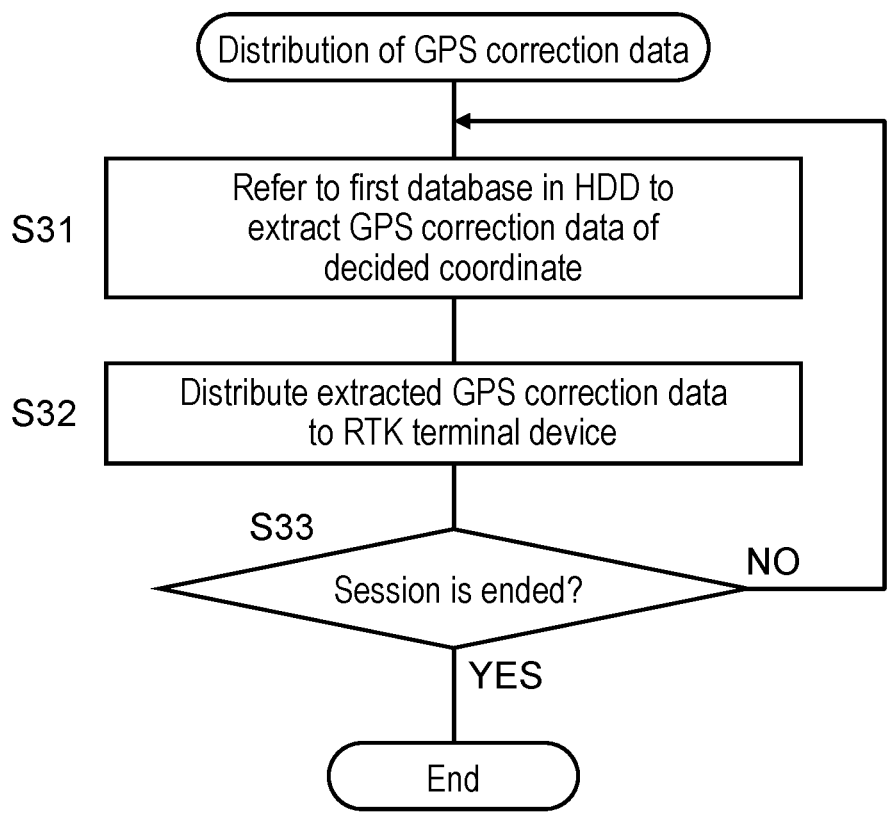
FIG. 8 is a flowchart illustrating an operation to distribute the GPS correction data using GPS correction data distribution device 10 according to the first exemplary embodiment.

FIG. 8 is a flowchart illustrating an operation to distribute the GPS correction data using GPS correction data distribution device 10 according to the first exemplary embodiment. The operation to distribute the GPS correction data using GPS correction data distribution device 10 will be described with reference to the flowchart in FIG. 8.

First, GPS correction data manager 16 refers to first database $14_D$ in HDD 14 to extract the GPS correction data of the decided coordinate (S31). Then, GPS correction data manager 16 distributes the extracted GPS correction data to RTK terminal device 20 through first communicator 11 (S32). Then, GPS correction data manager 16 determines whether the session is ended (S33). An example of determination of whether the session is ended in step S33 will be described below.

For example, because RTK terminal device 20 periodically transmits the GPS correction data distribution request at predetermined time intervals (for example, at 5-second intervals) in one session, GPS correction data manager 16 sets a session end flag when the GPS correction data distribution request is not received from RTK terminal device 20 for predetermined time interval or more. In step S33, GPS correction data manager 16 determines whether the session is ended based on presence or absence of the session end flag. When the session end flag is not set, the flow returns to step S31, and GPS correction data manager 16 periodically repeats the distribution of the GPS correction data at predetermined time intervals (for example, at 1-second intervals). On the other hand, when the session end flag is set, GPS correction data manager 16 ends the distribution of the GPS correction data.

Thus, in the present exemplary embodiment, GPS correction data manager 16 periodically and repeatedly distributes the GPS correction data of the coordinate initially set at the start of the session to RTK terminal device 20 at predetermined time intervals (for example, at 1-second intervals) when the GPS correction data distribution request is periodically received from RTK terminal device 20 at predetermined time intervals (for example, at 5-second intervals).

1-3. Effects and the Like

As described above, in the present exemplary embodiment, GPS correction data distribution device (an example of the GNSS correction data distribution device) 10 includes first communicator 11, second communicator 12, HDD 14, and GPS correction data manager 16. First communicator 11 communicates with RTK terminal device 20. Second communicator 12 communicates with GPS correction data server (an example of the GNSS correction data server) 30. HDD 14 stores first database $14_D$ (an example of the GNSS correction data information) in which at least one coordinate and the GPS correction data (VRS) (an example of the GNSS correction data) are in association with each other. GPS correction data manager 16 manages first database $14_D$. GPS correction data manager 16 obtains the GPS correction data from GPS correction data server 30 through second communicator 12 with respect to the coordinate in first database $14_D$, and updates first database $14_D$ while associating the coordinate with the GPS correction data. Upon receipt of the GPS correction data distribution request (an example of the GNSS correction data distribution request) from RTK terminal device 20 through first communicator 11, GPS correction data manager 16 refers to first database $14_D$, extracts the GPS correction data of the coordinate corresponding to the position of RTK terminal device 20, and distributes the extracted GPS correction data to RTK terminal device 20.

Therefore, HDD 14 stores the first database in which the coordinate and the GPS correction data are in association with each other, and upon receipt of the GPS correction data distribution request from RTK terminal device 20, GPS correction data manager 16 refers to the first database, extracts the GPS correction data of the coordinate corresponding to the position of RTK terminal device 20, and distributes the extracted GPS correction data to RTK terminal device 20. Thus, upon receipt of the GPS correction data distribution request from RTK terminal device 20, GPS correction data manager 16 can transmit the GPS correction data to RTK terminal device 20 without making an inquiry to the GPS correction data server. Therefore, it is possible to shorten time necessary for the obtainment of the GPS correction data since RTK terminal device 20 makes the request for the GPS correction data.

Second Exemplary Embodiment

Another problem related to the initial setting of the GPS correction data in the present disclosure will be described with reference to FIG. 9. FIG. 9 is a view illustrating an example of a relationship between coordinates $P_{A1}$, $P_{A2}$, $P_{A3}$, $P_{A4}$ in first database $14_D$ of GPS correction data distribution device 10 and positions $P_{B1}$, $P_{B2}$ of RTK terminal device 20. As illustrated in FIG. 9, in the case where a distance between position $P_{B1}$ of RTK terminal device 20 and each of a plurality of coordinates $P_{A1}$, $P_{A2}$, $P_{A3}$, $P_{A4}$ managed in first database $14_D$ falls within a predetermined range of $R_1-\alpha$ to $R_1+\alpha$, it is assumed that GPS correction data distribution device 10 decides coordinate $P_{A1}$ closest to position $P_{B1}$ of RTK terminal device 20 as the coordinate of the GPS correction data to be distributed when GPS correction data distribution device 10 receives the GPS correction data distribution request from RTK terminal device 20. At this point, $R_1+\alpha \leq Rmax$ holds. Rmax is the maximum distance between the position of RTK terminal device 20 and the position of the GPS correction data in performing the high-accuracy RTK positioning. In this case, RTK terminal device 20 moves in a direction in which a distance between the position of RTK terminal device 20 and coordinate $P_{A1}$ increases, and there is a possibility that the distance between the position of RTK terminal device 20 and coordinate $P_{A1}$ exceeds maximum distance Rmax. In this case, the accuracy of the RTK positioning of RTK terminal device 20 is degraded when the GPS correction data of coordinate $P_{A1}$ initially set at position $P_{B1}$ is used.

The problem occurs in the case where, for example, in an agricultural scene, the user makes the connection request using position $P_{B1}$ of a user's home and then moves to position $PB_2$ of a rice field to perform the RTK positioning. In such cases, it is expected that the RTK terminal device is used in an identical place (rice field) every time.

Therefore, in the second exemplary embodiment, GPS correction data manager 16 performs operation of one of items (1) to (3) in the initial setting of the GPS correction data in the case where the distance between position $P_{B1}$ of RTK terminal device 20 and each of the plurality of coordinates $P_{A1}$, $P_{A2}$, $P_{A3}$, $P_{A4}$ in first database $14_D$ falls within the predetermined range of $R_1-\alpha$ to $R_1+\alpha$.

(1) The coordinate of the GPS correction data to be distributed is decided based on the coordinate of the GPS correction data distributed in the preceding session, (2) The coordinate of the GPS correction data to be distributed is decided based on the position of RTK terminal device 20, the position being received in the preceding session, or (3) The coordinate of the GPS correction data to be distributed is decided based on a movement direction of RTK terminal device 20.

The items (1) to (3) will be described in detail below.

(1) The initial setting of the GPS correction data based on the coordinate of the GPS correction data distributed in the preceding session The initial setting of the GPS correction data in the present exemplary embodiment will be described below with reference to FIGS. 10 to 13.

FIG. 10 is a view illustrating a configuration of first database $14_D$ in GPS correction data distribution device according to the second exemplary embodiment. As illustrated in FIG. 10, first database $14_D$ includes, in addition to the coordinate and the GPS correction data, distribution presence/absence information indicating the GPS correction data of which coordinate is distributed in the preceding session.

FIG. 11 is a view illustrating an example of a relationship between coordinates $P_{A1}$, $P_{A2}$, $P_{A3}$, $P_{A4}$, which are managed by first database $14_D$ in GPS correction data distribution device 10, and position $P_{B1}$ of RTK terminal device 20. For example, it is assumed that first database $14_D$ includes information indicating that the GPS correction data of coordinate $P_{A3}$ is distributed in the preceding session.

As illustrated in FIG. 11, upon receipt of the GPS correction data distribution request, GPS correction data manager 16 refers to first database $14_D$ to determine whether the distance between position $P_{B1}$ of RTK terminal device 20, position $P_{B1}$ being included in the GPS correction data distribution request, and each of the plurality of coordinates $P_{A1}$, $P_{A2}$, $P_{A3}$, $P_{A4}$ in first database $14_D$ falls within the predetermined range of $R_1-\alpha$ to $R_1+\alpha$. When the distance between position $P_{B1}$ of RTK terminal device 20 and each of the plurality of coordinates $P_{A1}$, $P_{A2}$, $P_{A3}$, $P_{A4}$ in first database $14_D$ falls within the predetermined range, GPS correction data manager 16 decides coordinate $P_{A3}$ distributed in the preceding session as the coordinate of the GPS correction data to be distributed (the initial setting of the GPS correction data).

On the other hand, when the distance between position $P_{B1}$ of RTK terminal device 20 and each of the plurality of coordinates $P_{A1}$, $P_{A2}$, $P_{A3}$, $P_{A4}$ in first database $14_D$ is out of the predetermined range, GPS correction data manager 16 performs the initial setting of the GPS correction data of the first exemplary embodiment.

For example, GPS correction data manager 16 writes the distribution presence/absence information in first database $14_D$ with respect to the distributed GPS correction data and the coordinate of the GPS correction data.

FIG. 12 is a flowchart illustrating an operation to initially set the GPS correction data using GPS correction data distribution device 10 according to the second exemplary embodiment.

First, the operations in steps S21 to S23 are performed similarly to FIG. 7. Then, upon receipt of the GPS correction data distribution request from RTK terminal device 20 through first communicator 11 (S23), GPS correction data manager 16 refers to first database $14_D$ to determine whether the distance between position $P_{B1}$ of RTK terminal device 20, position $P_{B1}$ being included in the GPS correction data distribution request, and each of the plurality of coordinates $P_{A1}$, $P_{A2}$, $P_{A3}$, $P_{A4}$ in first database $14_D$ falls within the predetermined range of $R_1-\alpha$ to $R_1+\alpha$ (S25) (see FIG. 9).

When the distance between position $P_{B1}$ of RTK terminal device 20 and each of the plurality of coordinates $P_{A1}$, $P_{A2}$, $P_{A3}$, $P_{A4}$ in first database $14_D$ falls within the predetermined range, GPS correction data manager 16 decides coordinate $P_{A3}$ distributed in the preceding session as the coordinate of the GPS correction data to be distributed, and stores coordinate $P_{A3}$ (S26) (see FIG. 11). On the other hand, when the distance between position $P_{B1}$ of RTK terminal device 20 and each of the plurality of coordinates $P_{A1}$, $P_{A2}$, $P_{A3}$, $P_{A4}$ in first database $14_D$ is out of the predetermined range in step S25, the operation in step S24 is performed similarly to FIG. 7.

FIG. 13 is a flowchart illustrating an operation to distribute the GPS correction data using GPS correction data distribution device 10 according to the second exemplary embodiment. As illustrated in FIG. 13, in the second exemplary embodiment, after the operations in steps S31 and S32 are performed similarly to FIG. 8, for example, GPS correction data manager 16 writes the distribution presence/absence information in first database $14_D$ with respect to the distributed GPS correction data and the coordinate of the GPS correction data (S34). Then, the operation in step S33 is performed similarly to FIG. 8.

In the present exemplary embodiment, the following effect can be obtained in addition to the effect of the first exemplary embodiment. In the present exemplary embodiment, upon receipt of the GPS correction data distribution request, GPS correction data manager 16 refers to first database $14_D$, and when the distance between position $P_{B1}$ of RTK terminal device 20, position $P_{B1}$ being included in the GPS correction data distribution request, and each of the plurality of coordinates $P_{A1}$, $P_{A2}$, $P_{A3}$, $P_{A4}$ in first database $14_D$ falls within the predetermined range of $R_1-\alpha$ to $R_1+\alpha$, GPS correction data manager 16 extracts not the GPS correction data of coordinate $P_{A1}$ closest to position $P_{B1}$ of RTK terminal device 20 but the GPS correction data of coordinate $P_{A3}$ distributed in the preceding session, and distributes the GPS correction data of coordinate $P_{A3}$ to RTK terminal device 20.

Therefore, the appropriate GPS correction data can be distributed in the scene, such as the agricultural scene, where the RTK terminal device is used in the same place (for example, the rice field) every time.

(2) The initial setting of the GPS correction data based on the position of RTK terminal device 20, the position being received in the preceding session The initial setting of the GPS correction data in the present exemplary embodiment will be described below with reference to FIGS. 14 to 17.

FIG. 14 is a view illustrating a configuration of the second database in the GPS correction data distribution device according to the second exemplary embodiment. As described above, RTK terminal device 20 periodically transmits the GPS correction data distribution request at predetermined time intervals (for example, at 5-second intervals) in one session. As illustrated in FIG. 14, second database 14$_{D2}$ includes the position of RTK terminal device 20, the position being received from RTK terminal device 20 at predetermined time intervals, and reception date information about the position of RTK terminal device 20. For example, second database 14$_{D2}$ is stored in HDD 14. The position of RTK terminal device 20 and the reception date information about the position of RTK terminal device 20 in second database 14$_{D2}$ may be a GGA format received from RTK terminal device 20 or a format into which the GGA format is converted.

Figure 15:
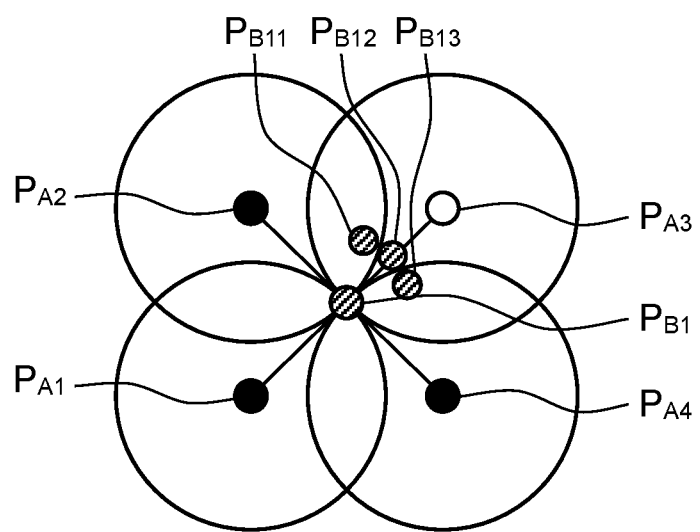
FIG. 15 is a view illustrating an example of a relationship between the coordinate managed in the first database of GPS correction data distribution device 10 and the position of RTK terminal device 20 managed in the second database, and is a view illustrating a solution to another problem.

FIG. 15 is a view illustrating an example of a relationship between coordinates $P_{A1}$, $P_{A2}$, $P_{A3}$, $P_{A4}$ managed in first database 14$_D$ of GPS correction data distribution device 10 and positions $P_{B11}$, $P_{B12}$, $P_{B13}$ of RTK terminal device 20, positions $P_{B11}$, $P_{B12}$, $P_{B13}$ being managed in second database 14$_{D2}$. For example, it is assumed that second database 14$_{D2}$ includes positions $P_{B11}$, $P_{B12}$, $P_{B13}$ of RTK terminal device 20, positions $P_{B11}$, $P_{B12}$, $P_{B13}$ being sequentially received at predetermined time intervals in the preceding session.

As illustrated in FIG. 15, upon receipt of the GPS correction data distribution request, GPS correction data manager 16 refers to first database 14$_D$ to determine whether the distance between position $P_{B1}$ of RTK terminal device 20, position $P_{B1}$ being included in the GPS correction data distribution request, and each of the plurality of coordinates $P_{A1}$, $P_{A2}$, $P_{A3}$, $P_{A4}$ in first database 14$_D$ falls within the predetermined range of $R_1-\alpha$ to $R_1+\alpha$. When the distance between position $P_{B1}$ of RTK terminal device 20 and each of the plurality of coordinates $P_{A1}$, $P_{A2}$, $P_{A3}$, $P_{A4}$ in first database 14$_D$ falls within the predetermined range, GPS correction data manager 16 initially sets coordinate $P_{A3}$ of the GPS correction data to be distributed based on positions $P_{B11}$, $P_{B12}$, $P_{B13}$ of RTK terminal device 20, positions $P_{B11}$, $P_{B12}$, $P_{B13}$ being received in the preceding session. Specifically, GPS correction data manager 16 decides coordinate $P_{A3}$ closest to last position $P_{B13}$ in positions $P_{B11}$, $P_{B12}$, $P_{B13}$ of RTK terminal device 20, positions $P_{B11}$, $P_{B12}$, $P_{B13}$ being received at predetermined time intervals in the preceding session, as the coordinate of the GPS correction data to be distributed.

On the other hand, when the distance between position $P_{B1}$ of RTK terminal device 20 and each of the plurality of coordinates $P_{A1}$, $P_{A2}$, $P_{A3}$, $P_{A4}$ in first database 14$_D$ is out of the predetermined range, GPS correction data manager 16 performs the initial setting of the GPS correction data of the first exemplary embodiment.

For example, GPS correction data manager 16 writes the position of RTK terminal device 20, the position being received at predetermined time intervals, and the reception date information of the position in first database 14$_D$.

Figure 16:
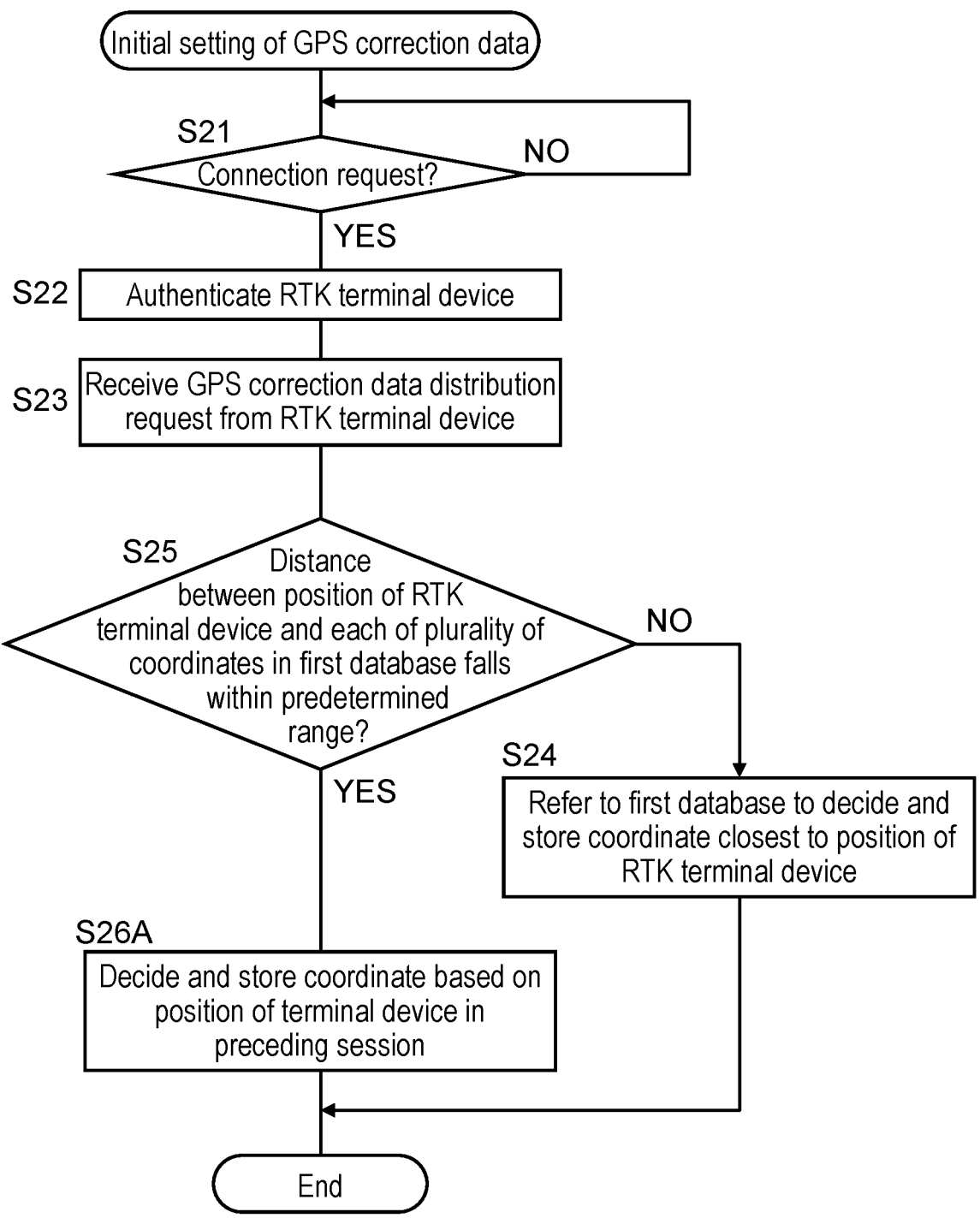
FIG. 16 is a flowchart illustrating the operation to initially set the GPS correction data using GPS correction data distribution device 10 according to the second exemplary embodiment.

FIG. 16 is a flowchart illustrating the operation to initially set the GPS correction data using GPS correction data distribution device 10 according to the second exemplary embodiment.

First, the operations in steps S21 to S23, and S25 are performed similarly to FIG. 12. When the distance between position $P_{B1}$ of RTK terminal device 20 and each of the plurality of coordinates $P_{A1}$, $P_{A2}$, $P_{A3}$, $P_{A4}$ in first database 14$_D$ falls within the predetermined range in step S25, GPS correction data manager 16 decides coordinate $P_{A3}$ of the GPS correction data to be distributed based on positions $P_{B11}$, $P_{B12}$, $P_{B13}$ of RTK terminal device 20, positions $P_{B11}$, $P_{B12}$, $P_{B13}$ being received in the preceding session, and stores coordinate $P_{A3}$ (S26A) (see FIG. 15). Specifically, GPS correction data manager 16 decides coordinate $P_{A3}$ closest to last position $P_{B13}$ in positions $P_{B11}$, $P_{B12}$, $P_{B13}$ of RTK terminal device 20, positions $P_{B11}$, $P_{B12}$, $P_{B13}$ being received at predetermined time intervals in the preceding session, as the coordinate of the GPS correction data to be distributed. On the other hand, when the distance between position $P_{B1}$ of RTK terminal device 20 and each of the plurality of coordinates $P_{A1}$, $P_{A2}$, $P_{A3}$, $P_{A4}$ in first database 14$_D$ is out of the predetermined range in step S25, the operation in step S24 is performed similarly to FIG. 12. Then, the operation to distribute the GPS correction data in FIG. 8 is performed.

Figure 17:
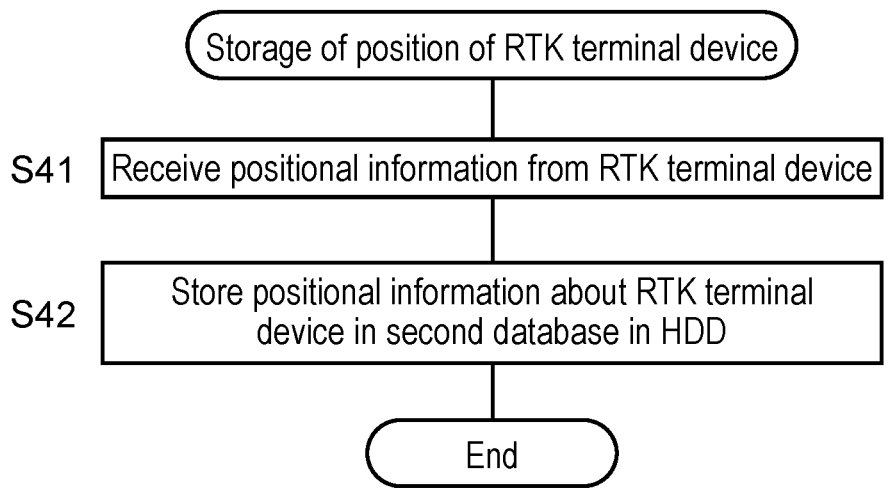
FIG. 17 is a flowchart illustrating an operation to store the position of RTK terminal device 20 using GPS correction data distribution device 10 according to the second exemplary embodiment.

FIG. 17 is a flowchart illustrating an operation to store the position of RTK terminal device using GPS correction data distribution device 10 according to the second exemplary embodiment. As illustrated in FIG. 17, GPS correction data manager 16 receives the positional information from RTK terminal device 20 (S41), and stores the positional information about RTK terminal device 20 in second database 14$_{D2}$ of HDD 14 (S42). Because RTK terminal device 20 periodically and repeatedly distributes the positional information about RTK terminal device 20 at predetermined time intervals, GPS correction data manager 16 repeats the operations in steps S41 and S42, and sequentially stores the position of RTK terminal device 20, the position being received at predetermined time intervals, and the reception date information of the position in second database 14$_{D2}$.

In the present exemplary embodiment, the following effect can be obtained in addition to the effect of the first exemplary embodiment. In the present exemplary embodiment, upon receipt of the GPS correction data distribution request, GPS correction data manager 16 refers to first database 14$_D$, and when the distance between position $P_{B1}$ of RTK terminal device 20 and each of the plurality of coordinates $P_{A1}$, $P_{A2}$, $P_{A3}$, $P_{A4}$ in first database 14$_D$ falls within the predetermined range of $R_1-\alpha$ to $R_1+\alpha$, GPS correction data manager 16 extracts the GPS correction data of coordinate $P_{A3}$ based on not the GPS correction data of coordinate $P_{A1}$ closest to current position $P_{B1}$ of RTK terminal device 20 but positions $P_{B11}$, $P_{B12}$, $P_{B13}$ of RTK terminal device 20, positions $P_{B11}$, $P_{B12}$, $P_{B13}$ being received in the preceding session, and distributes the GPS correction data of coordinate $P_{A3}$ to RTK terminal device 20.

Therefore, the appropriate GPS correction data can be distributed in the scene, such as the agricultural scene, where RTK terminal device 20 is used in the same place (for example, the rice field) every time.

GPS correction data manager 16 extracts the GPS correction data of coordinate $P_{A3}$ closest to final position $P_{B13}$ in positions $P_{B11}$, $P_{B12}$, $P_{B13}$ of RTK terminal device 20, positions $P_{B11}$, $P_{B12}$, $P_{B13}$ being received at predetermined time intervals in the preceding session, and distributes the GPS correction data of coordinate $P_{A3}$ to RTK terminal device 20. Therefore, this is effective when work of the previous day is continued in the agricultural scene.

(3) The initial setting of the GPS correction data based on the movement direction of RTK terminal device 20

The initial setting of the GPS correction data in the present exemplary embodiment will be described below with reference to FIGS. 18 and 19.

Figure 18:
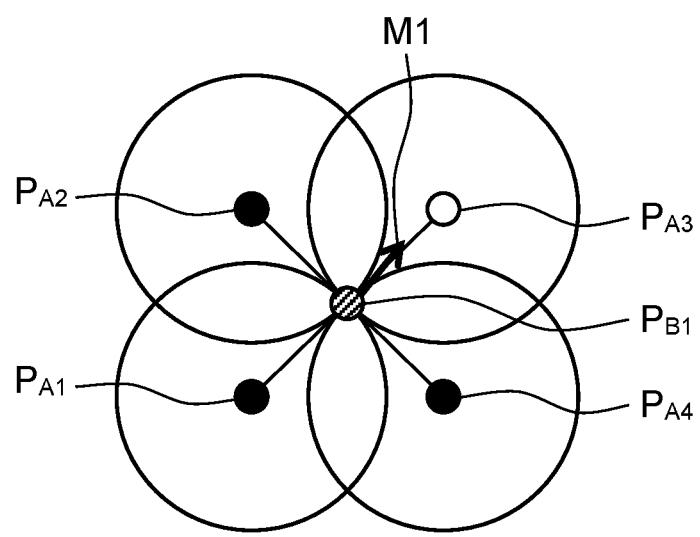
FIG. 18 is a view illustrating an example of a relationship between the coordinate managed in the first database of GPS correction data distribution device 10 and the position of RTK terminal device 20, and is a view illustrating a solution to another problem.

FIG. 18 is a view illustrating an example of a relationship between coordinates $P_{A1}$, $P_{A2}$, $P_{A3}$, $P_{A4}$ managed in first database 14$_D$ of GPS correction data distribution device 10, and position $P_{B1}$ of RTK terminal device 20. As illustrated in FIG. 18, upon receipt of the GPS correction data distribution request, GPS correction data manager 16 refers to first database $14_D$ to determine whether the distance between position $P_{B1}$ of RTK terminal device 20, position $P_{B1}$ being included in the GPS correction data distribution request, and each of the plurality of coordinates $P_{A1}$, $P_{A2}$, $P_{A3}$, $P_{A4}$ in first database $14_D$ falls within the predetermined range of $R_1-\alpha$ to $R_1+\alpha$. When the distance between position $P_{B1}$ of RTK terminal device 20 and each of the plurality of coordinates $P_{A1}$, $P_{A2}$, $P_{A3}$, $P_{A4}$ in first database $14_D$ falls within the predetermined range, GPS correction data manager 16 obtains the movement direction of RTK terminal device 20 based on a predetermined number of positions of RTK terminal device 20, the positions being received at the start of the current session, and initially sets coordinate $P_{A3}$ of the GPS correction data to be distributed based on movement direction $M_1$ of RTK terminal device 20. Specifically, GPS correction data manager 16 decides coordinate $P_{A3}$ closest in movement direction $M_1$ in the plurality of coordinates $P_{A1}$, $P_{A2}$, $P_{A3}$, $P_{A4}$ as the coordinate of the GPS correction data to be distributed.

On the other hand, when the distance between position $P_{B1}$ of RTK terminal device 20 and each of the plurality of coordinates $P_{A1}$, $P_{A2}$, $P_{A3}$, $P_{A4}$ in first database $14_D$ is out of the predetermined range, GPS correction data manager 16 performs the initial setting of the GPS correction data of the first exemplary embodiment.

Figure 19:
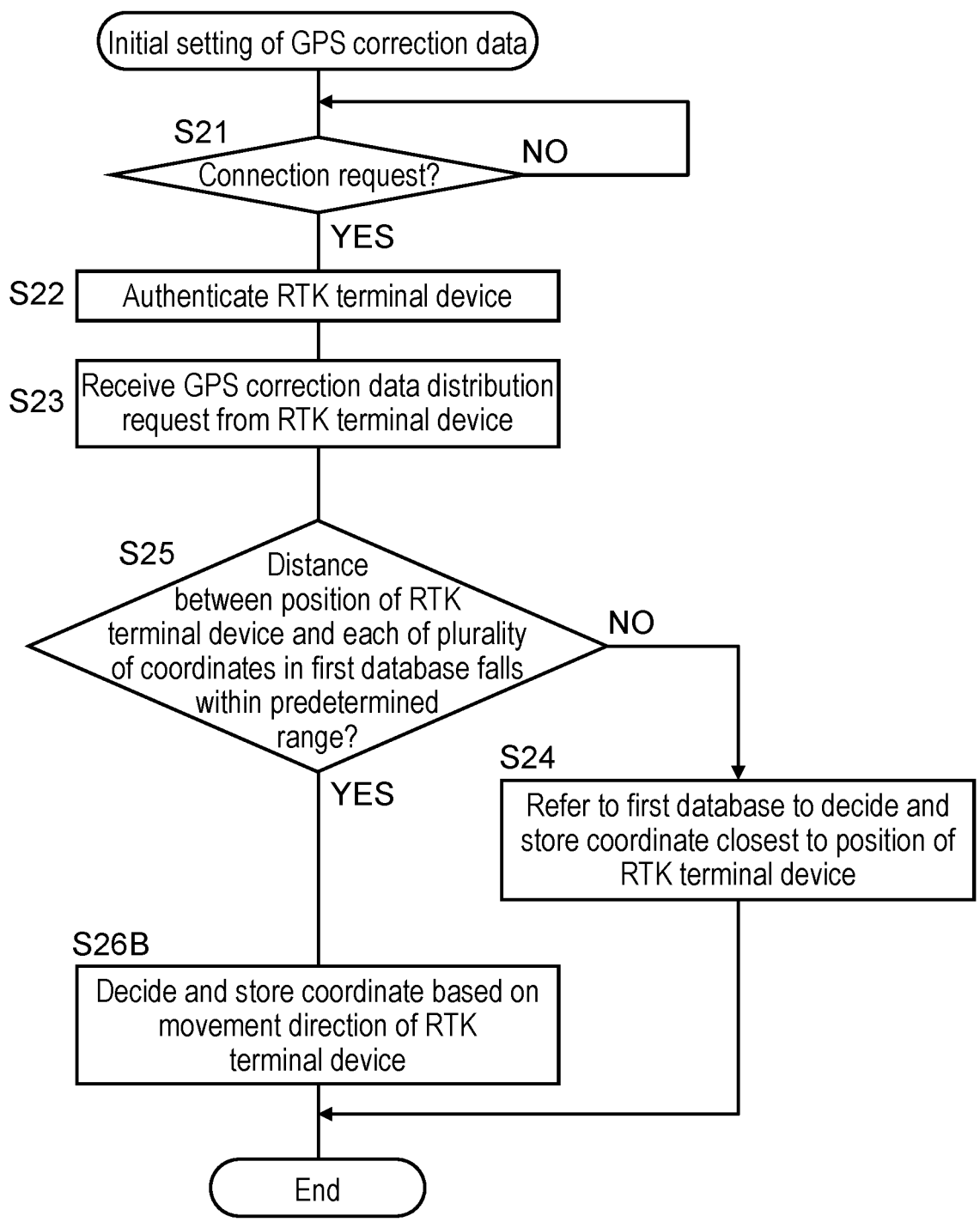
FIG. 19 is a flowchart illustrating the operation to initially set the GPS correction data using GPS correction data distribution device 10 according to the second exemplary embodiment.

FIG. 19 is a flowchart illustrating the operation to initially set the GPS correction data using GPS correction data distribution device 10 according to the second exemplary embodiment.

First, the operations in steps S21 to S23, and S25 are performed similarly to FIG. 12. When the distance between position $P_{B1}$ of RTK terminal device 20 and each of the plurality of coordinates $P_{A1}$, $P_{A2}$, $P_{A3}$, $P_{A4}$ in first database $14_D$ falls within the predetermined range in step S25, GPS correction data manager 16 obtains movement direction $M_1$ of RTK terminal device 20 based on the plurality of positions of RTK terminal device 20 at the start of the connection, and decides coordinate $P_{A3}$ of the GPS correction data to be distributed based on movement direction $M_1$, and stores coordinate $P_{A3}$ (S26B) (see FIG. 18). Specifically, GPS correction data manager 16 decides coordinate $P_{A3}$ closest in movement direction $M_1$ in the plurality of coordinates $P_{A1}$, $P_{A2}$, $P_{A3}$, $P_{A3}$ as the coordinate of the GPS correction data to be distributed. On the other hand, when the distance between position $P_{B1}$ of RTK terminal device 20 and each of the plurality of coordinates $P_{A1}$, $P_{A2}$, $P_{A3}$, $P_{A4}$ in first database $14_D$ is out of the predetermined range in step S25, the operation in step S24 is performed similarly to FIG. 12. Then, the operation to distribute the GPS correction data in FIG. 8 is performed.

In the present exemplary embodiment, the following effect can be obtained in addition to the effect of the first exemplary embodiment. In the present exemplary embodiment, upon receipt of the GPS correction data distribution request, GPS correction data manager 16 refers to first database $14_D$, and when the distance between position $P_{B1}$ of RTK terminal device 20, position $P_{B1}$ being included in the GPS correction data distribution request, and each of the plurality of coordinates $P_{A1}$, $P_{A2}$, $P_{A3}$, $P_{A4}$ in first database $14_D$ falls within the predetermined range of $R_1-\alpha$ to $R_1+\alpha$, GPS correction data manager 16 extracts not the GPS correction data of coordinate $P_{A1}$ closest to position $P_{B1}$ of RTK terminal device 20 but the GPS correction data of coordinate $P_{A3}$ based on movement direction $M_1$ of RTK terminal device 20, and distributes the GPS correction data of coordinate $P_{A3}$ to RTK terminal device 20.

Therefore, the appropriate GPS correction data can be distributed in the scene, such as the agricultural scene, where the RTK terminal device is used in the same place (for example, the rice field) every time.

Third Exemplary Embodiment

A third exemplary embodiment will be described below with reference to FIGS. 20 to 23.

In the first exemplary embodiment, GPS correction data distribution device 10 obtains the GPS correction data from GPS correction data server 30 with respect to the predetermined coordinate, and updates first database $14_D$ while associating the coordinate with the GPS correction data. On the other hand, in the third exemplary embodiment, upon receipt of the GPS correction data distribution request from RTK terminal device 20, GPS correction data distribution device 10 obtains the GPS correction data from GPS correction data server 30 with respect to the coordinate indicating the position of RTK terminal device 20, the coordinate being included in the GPS correction data distribution request, and updates first database $14_D$ while associating the coordinate with the obtained GPS correction data.

In the third exemplary embodiment, upon receipt of the GPS correction data distribution request from RTK terminal device 20 through first communicator 11, GPS correction data manager 16 refers to first database $14_D$ to determine whether the coordinate, which is included in the GPS correction data distribution request and corresponds to the position of RTK terminal device 20, exists in first database $14_D$. Specifically, GPS correction data manager 16 determines whether the coordinate close to the position of RTK terminal device 20, for example, the coordinate in a predetermined range (for example, a range of a radius of about 10 km or less) centering on the position of RTK terminal device 20 exists in first database $14_D$.

Figure 20A:
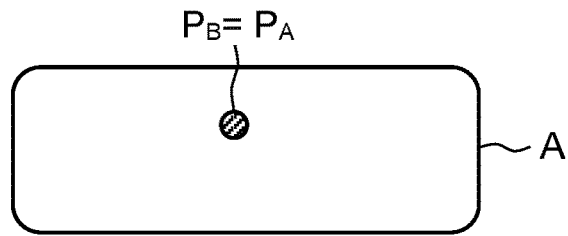
FIG. 20A is a view illustrating an example of a relationship between the coordinate in a first database in GPS correction data distribution device 10 according to a third exemplary embodiment and the position of RTK terminal device 20.
Figure 20B:
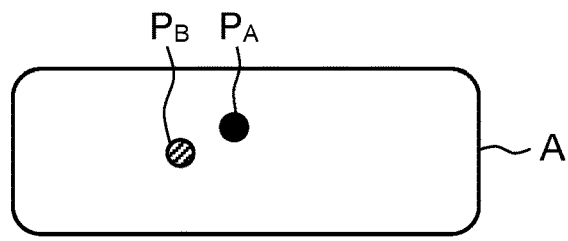
FIG. 20B is a view illustrating an example of a relationship between the coordinate in the first database in GPS correction data distribution device 10 according to the third exemplary embodiment and the position of RTK terminal device 20.

FIGS. 20A and 20B are views illustrating an example of a relationship between coordinate $P_A$ in first database $14_D$ of GPS correction data distribution device 10 according to the third exemplary embodiment and position $P_B$ of the RTK terminal device. When the coordinate close to position $P_B$ of RTK terminal device 20 does not exist in first database $14_D$, as illustrated in FIG. 20A, GPS correction data manager 16 obtains the GPS correction data from GPS correction data server 30 through second communicator 12 with respect to coordinate $P_A$ ($P_B=P_A$) corresponding to position $P_B$ of RTK terminal device 20, and updates first database $14_D$ while associating coordinate $P_A$ with the GPS correction data. GPS correction data manager 16 extracts the GPS correction data of coordinate $P_A$ ($P_B=P_A$) corresponding to position $P_B$ of RTK terminal device 20, and repeatedly distributes the GPS correction data to RTK terminal device 20 at predetermined time intervals (for example, at 1-second intervals).

On the other hand, as illustrated in FIG. 20B, when coordinate $P_A$ close to position $P_B$ of RTK terminal device 20 exists in first database $14_D$, GPS correction data manager 16 extracts the GPS correction data of coordinate $P_A$ from first database $14_D$. GPS correction data manager 16 repeatedly distributes the extracted GPS correction data to RTK terminal device 20 at predetermined time intervals (for example, at 1-second intervals).

Figure 20C:
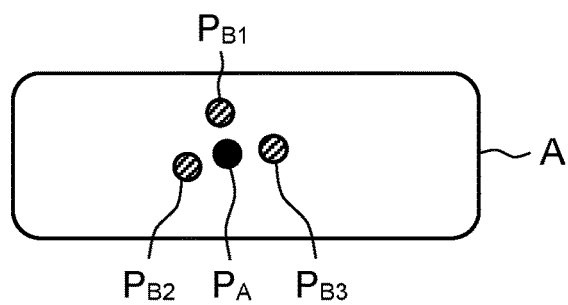
FIG. 20C is a view illustrating an example of a relationship between the coordinate in the first database in GPS correction data distribution device 10 according to the third exemplary embodiment and the positions of the plurality of RTK terminal devices 20.

As illustrated in FIG. 20C, in the case where identical coordinate $P_A$ closest to positions $P_{B1}$, $P_{B2}$, $P_{B3}$ of the plurality of RTK terminal devices 20 exists, GPS correction data manager 16 can distribute the GPS correction data of identical coordinate $P_A$ to the plurality of RTK terminal devices 20.

FIG. 21 is a flowchart illustrating the operation to initially set the GPS correction data using GPS correction data distribution device 10 according to the third exemplary embodiment.

First, the operations in steps S21 to S23 are performed similarly to FIG. 7. Then, upon receipt of the GPS correction data distribution request from RTK terminal device 20 through first communicator 11 (S23), GPS correction data manager 16 refers to first database $14_D$ to determine whether the coordinate, which is included in the GPS correction data distribution request and corresponds to the position of RTK terminal device 20, exists in first database $14_D$ (S40). Specifically, GPS correction data manager 16 determines whether the coordinate close to the position of RTK terminal device 20, for example, the coordinate in a predetermined range centering on the position of RTK terminal device 20 exists in first database $14_D$.

When the coordinate close to the position of RTK terminal device 20 does not exist in first database $14_D$, GPS correction data manager 16 writes coordinate $P_A$ ($P_B = P_A$) corresponding to position $P_B$ of RTK terminal device 20 in first database $14_D$, and updates first database $14_D$ (S41) (see FIG. 20A). Then, the operation to update the GPS correction data in first database $14_D$ illustrated in FIG. 6, namely, the operations in steps S11 to S14 are performed, the GPS correction data is obtained from GPS correction data server 30 through second communicator 12 with respect to coordinate $P_A$, and first database $14_D$ is updated while coordinate $P_A$ and the GPS correction data are in association with each other (S10). Then, the flow returns to step S40.

On the other hand, when the coordinate close to the position of RTK terminal device 20 exists in first database $14_D$ in step S40, GPS correction data manager 16 decides the coordinate as the coordinate of the GPS correction data to be distributed, and stores the coordinate close to the position of RTK terminal device 20 (S24) (see FIG. 20B). Then, the operation to distribute the GPS correction data in FIG. 13 is performed.

Thus, in the present exemplary embodiment, GPS correction data manager 16 decides the GPS correction data only once upon receipt of the GPS correction data distribution request from RTK terminal device 20, namely, at the start of the session, and repeatedly distributes the GPS correction data identical in the session to RTK terminal device 20 at predetermined time intervals.

As described above, in the present exemplary embodiment, upon receipt of the GPS correction data distribution request from RTK terminal device 20, GPS correction data manager 16 obtains the GPS correction data from GPS correction data server 30 with respect to the coordinate indicating the position of RTK terminal device 20, the coordinate being included in the GPS correction data distribution request, and updates first database $14_D$ while associating the coordinate with the obtained GPS correction data. Upon receipt of the GPS correction data distribution request from RTK terminal device 20 through first communicator 11, GPS correction data manager 16 refers to first database $14_D$, extracts the GPS correction data of the coordinate corresponding to the position of RTK terminal device 20, the coordinate being included in the GPS correction data distribution request, and distributes the extracted GPS correction data to RTK terminal device 20.

Therefore, in the second-time or subsequent operation to distribute the GPS correction data, it is possible to shorten the data obtainment time which is time necessary for the obtainment of the GPS correction data since RTK terminal device 20 makes the request for the GPS correction data.

[Editing of First Database]

A number of pieces of GPS correction data that can be obtained from GPS correction data server 30 with GPS correction data distribution device 10 may be restricted.

Regarding this point, GPS correction data manager 16 decreases the number of coordinates managed in first database $14_D$ when a predetermined condition is satisfied. As used herein, for example, the predetermined condition means that the number of coordinates (that is, the number of pieces of GPS correction data) in first database $14_D$ reaches an upper limit. Alternatively, the predetermined condition may be a previously-set predetermined date. In this case, for example, the number of coordinates in first database $14_D$ may periodically be decreased in nighttime hours when the sessions of all the RTK terminal devices are expected to be ended.

Figure 20D:
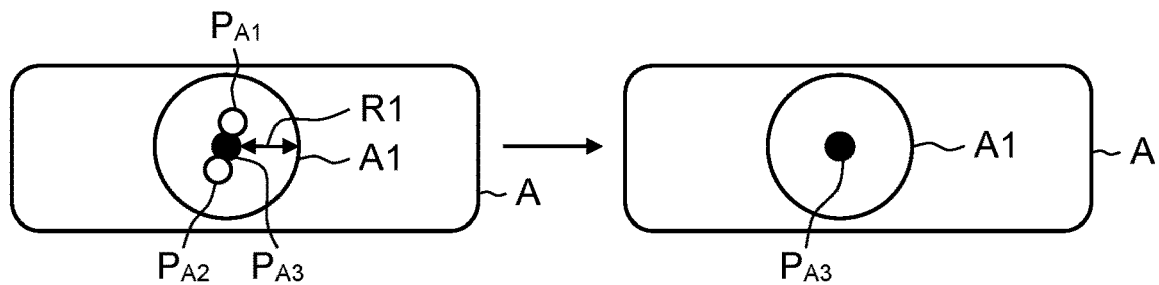
FIG. 20D is a view illustrating an example of a coordinate in the first database of GPS correction data distribution device 10 according to the third exemplary embodiment.

FIG. 22 is a view illustrating a configuration of first database $14_D$ in a GPS correction data distribution device according to the third exemplary embodiment. As illustrated in FIG. 22, first database $14_D$ includes an update date of the coordinate in addition to the coordinate and the GPS correction data. FIG. 20D is a view illustrating an example of coordinates $P_{A1}$, $P_{A2}$, $P_{A3}$ in first database $14_D$ of GPS correction data distribution device 10 according to the third exemplary embodiment. As illustrated in FIG. 20D, for example, GPS correction data manager 16 deletes coordinates $P_{A1}$, $P_{A2}$ other than latest coordinate $P_{A3}$ in predetermined area A1 (R1≤Rmax, Rmax is the maximum distance between the position of RTK terminal device 20 and the position of the GPS correction data in performing the high-accuracy RTK positioning) having radius R1 centering on coordinate $P_{A3}$ updated lastly in first database $14_D$.

Figure 23:
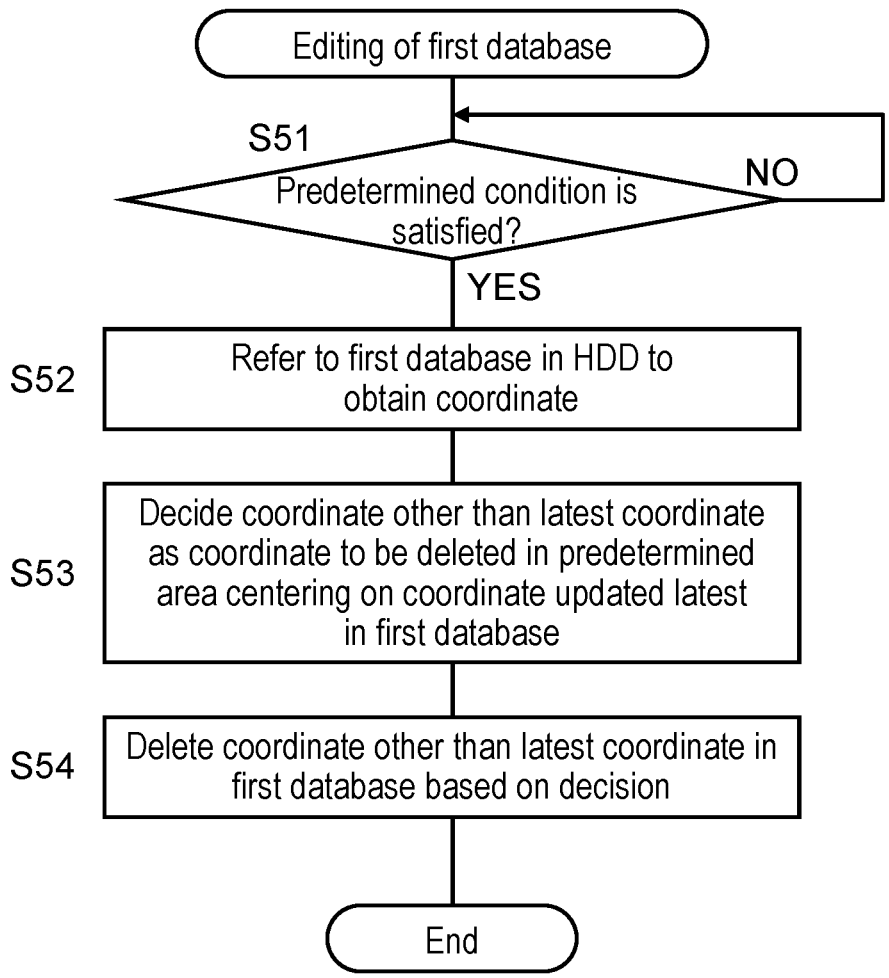
FIG. 23 is a flowchart illustrating operation to edit database using GPS correction data distribution device 10 according to the third exemplary embodiment.

FIG. 23 is a flowchart illustrating the operation to edit first database $14_D$ using GPS correction data distribution device 10 according to the third exemplary embodiment.

First, GPS correction data manager 16 determines whether the predetermined condition is satisfied, for example, whether the number of coordinates in first database $14_D$ (that is, the number of pieces of GPS correction data) reaches the upper limit (S51). When the predetermined condition is not satisfied, the flow returns to step S51. On the other hand, when the predetermined condition is satisfied, GPS correction data manager 16 refers to first database $14_D$ of HDD 14 to obtain coordinates $P_{A1}$, $P_{A2}$, $P_{A3}$ (S52) (see FIG. 20D). Then, in predetermined area A1 centering on coordinate $P_{A3}$ updated lastly in first database $14_D$, GPS correction data manager 16 decides coordinates $P_{A1}$, $P_{A2}$ other than latest coordinate $P_{A3}$ as the coordinate to be deleted (S53) (see FIG. 20D). Then, based on the decision, GPS correction data manager 16 deletes coordinates $P_{A1}$, $P_{A2}$ other than latest coordinate $P_{A3}$ in first database $14_D$ (S54).

As described above, in the present exemplary embodiment, GPS correction data manager 16 decreases the number of coordinates managed in first database $14_D$ when the predetermined condition is satisfied, for example, when the number of coordinates (that is, the number of pieces of GPS correction data) in first database $14_D$ reaches the upper limit. Specifically, as illustrated in FIG. 20D, in predetermined area A1 centering on coordinate $P_{A3}$ updated lastly in first database $14_D$, GPS correction data manager 16 deletes coordinates $P_{A1}$, $P_{A2}$ other than latest coordinate $P_{A3}$.

This configuration is effective in the case where the number of pieces of GPS correction data that can be obtained from GPS correction data server 30 by GPS correction data distribution device 10 is restricted.

Fourth Exemplary Embodiment

In the third exemplary embodiment, when the predetermined condition is satisfied in editing first database $14_D$, for example, when the number of coordinates (that is, the number of pieces of GPS correction data) in first database $14_D$ reaches the upper limit, the number of coordinates in first database $14_D$ is decreased based on the coordinate in first database $14_D$. On the other hand, in a fourth exemplary embodiment, in editing first database $14_D$, GPS correction data manager 16 decreases the number of coordinates in first database $14_D$ based on the position of RTK terminal device 20, the position being received in the past, like the following items (1) and (2).

(1) The number of coordinates in first database $14_D$ is decreased based on the position (movement history) of RTK terminal device 20, the position being received in the past, or (2) The number of coordinates in first database $14_D$ is decreased based on the position of RTK terminal device 20, the position being received in the past, and cartographic information.

The items (1) and (2) will be described in detail below.

(1) Editing of first database $14_D$ based on the position of RTK terminal device 20, the position being received in the past The editing of first database $14_D$ of the present exemplary embodiment will be described below with reference to FIGS. 24 and 25.

As illustrated in FIG. 14, GPS correction data distribution device 10 of the present exemplary embodiment includes second database $14_{D2}$, and second database $14_{D2}$ includes the position of RTK terminal device 20, the position being received from RTK terminal device 20 at predetermined time intervals, and the reception date information about the position of RTK terminal device 20.

Figure 24:
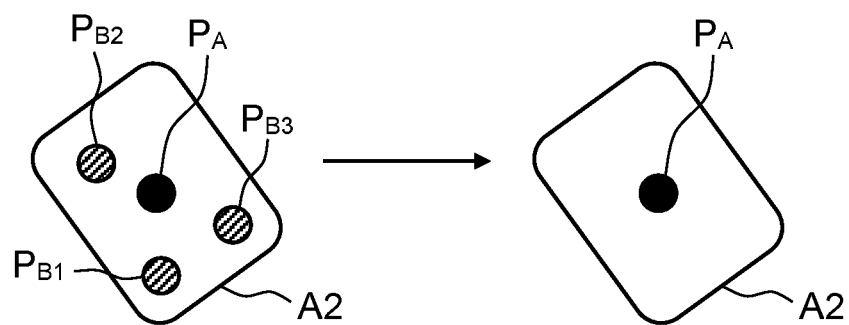
FIG. 24 is a view illustrating a relationship between the coordinate managed in a first database of GPS correction data distribution device 10 according to a fourth exemplary embodiment, and a position of RTK terminal device 20 managed in a second database.

FIG. 24 is a view illustrating a relationship between coordinate $P_A$, which is managed by first database $14_D$ of GPS correction data distribution device 10 according to the fourth exemplary embodiment, and positions $P_{B1}$, $P_{B2}$, $P_{B3}$ of RTK terminal device 20, which are managed by second database $14_{D2}$. As illustrated in FIG. 24, in each RTK terminal device 20, GPS correction data manager 16 decides a center coordinate which is centroid of positions $P_{B1}$, $P_{B2}$, $P_{B3}$ of RTK terminal device 20 in second database $14_{D2}$ as new coordinate $P_A$, and updates first database $14_D$ using decided coordinate $P_A$. At this point, GPS correction data manager 16 deletes the coordinate other than center coordinate $P_A$ of the coordinates corresponding to positions $P_{B1}$, $P_{B2}$, $P_{B3}$ of RTK terminal device 20 in the coordinate of the GPS correction data, the coordinate of the GPS correction data being distributed to RTK terminal device 20 in first database $14_D$ in the past.

Figure 25:
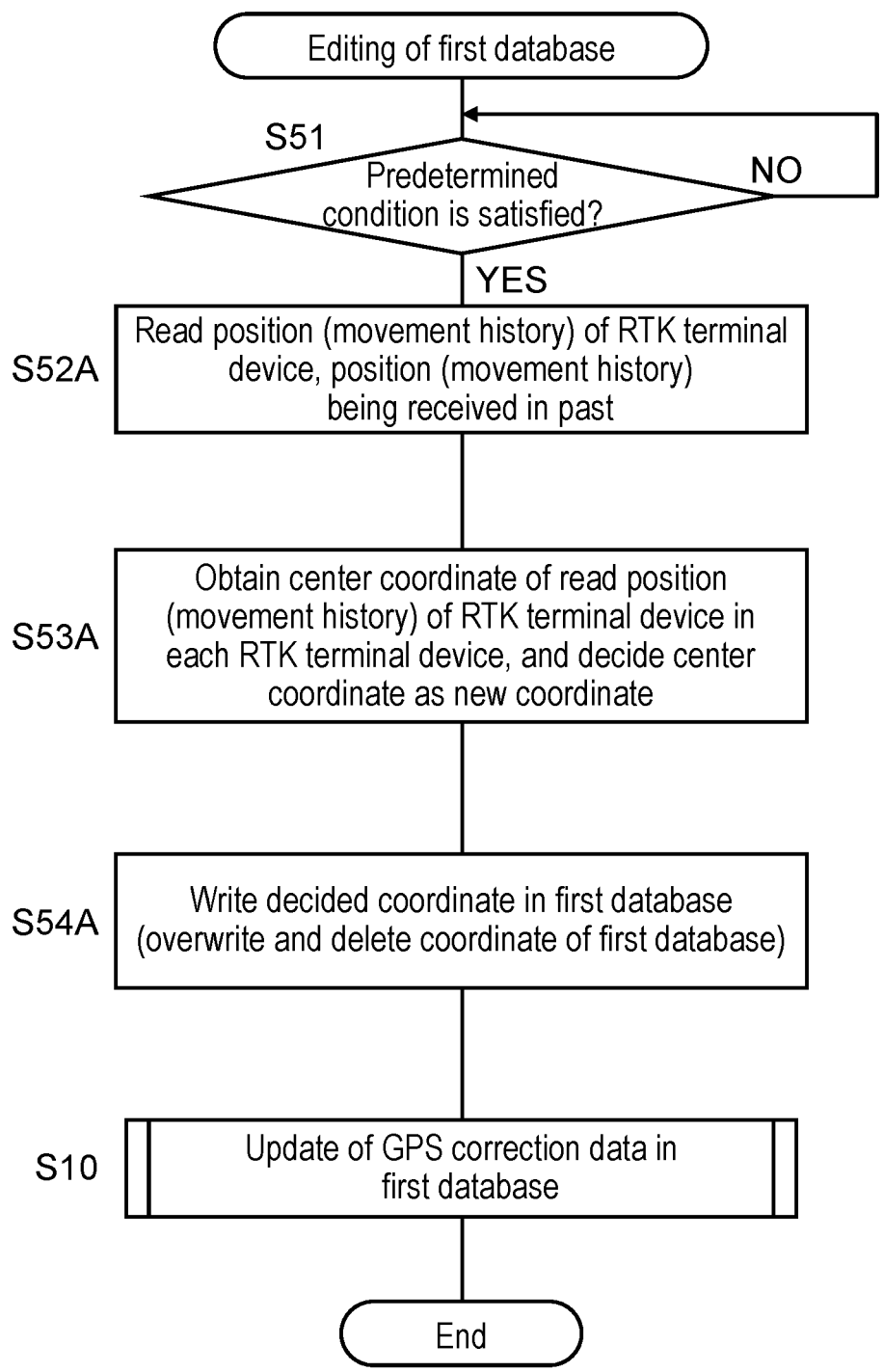
FIG. 25 is a flowchart illustrating the operation to edit the first database using GPS correction data distribution device 10 according to the fourth exemplary embodiment.

FIG. 25 is a flowchart illustrating the operation to edit first database $14_D$ using GPS correction data distribution device 10 according to the fourth exemplary embodiment.

First, the operation in step S51 is performed similarly to FIG. 23. Then, GPS correction data manager 16 refers to second database $14_{D2}$ to read the position (movement history) of RTK terminal device 20, the position being received in the past (S52A). Then, GPS correction data manager 16 obtains the center coordinate of the read position (movement history) of RTK terminal device 20, and decides the center coordinate as new coordinate $P_A$ (S53A) (see FIG. 24).

Then, GPS correction data manager 16 writes decided coordinate $P_A$ in first database $14_D$, thereby overwriting and deleting the coordinate of first database $14_D$ (S54A). Then, the operation to update the GPS correction data in first database $14_D$ illustrated in FIG. 6 is performed (S10).

The effect similar to that of the third exemplary embodiment can be obtained in the present exemplary embodiment.

(2) Editing of first database $14_D$ based on the position of RTK terminal device 20, the position being received in the past, and the cartographic information The editing of first database $14_D$ of the present exemplary embodiment will be described below with reference to FIGS. 26 and 27.

As illustrated in FIG. 14, GPS correction data distribution device 10 of the present exemplary embodiment includes second database $14_{D2}$, and second database $14_{D2}$ includes the position of RTK terminal device 20, the position being received from RTK terminal device 20 at predetermined time intervals, and the reception date information about the position of RTK terminal device 20.

Figure 26A:
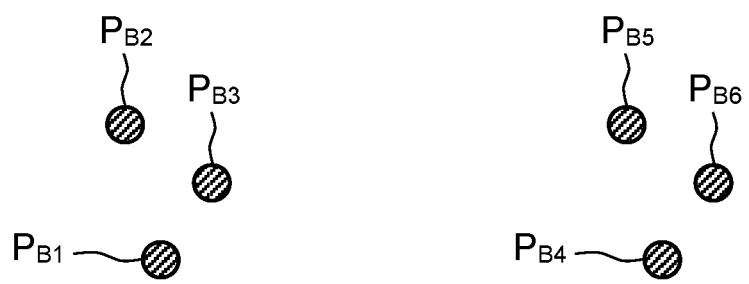
FIG. 26A is a view illustrating an example of the position of RTK terminal device 20 managed in the second database of GPS correction data distribution device 10 according to the fourth exemplary embodiment.

FIG. 26A is a view illustrating an example of positions $P_{B1}$, $P_{B2}$, $P_{B3}$, $P_{B4}$, $P_{B5}$, $P_{B6}$ of RTK terminal device 20, positions $P_{B1}$, $P_{B2}$, $P_{B3}$, $P_{B4}$, $P_{B5}$, $P_{B6}$ being managed in second database $14_{D2}$.

Figure 26B:
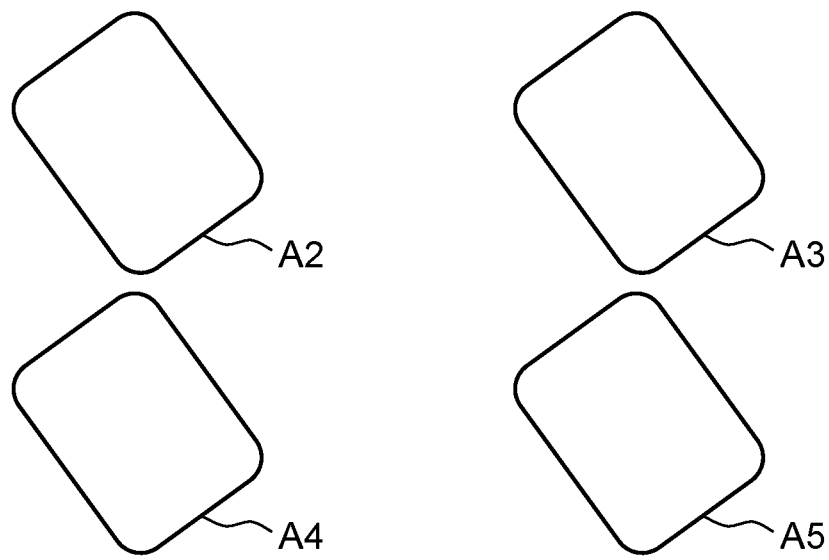
FIG. 26B is a view illustrating an example of cartographic information about GPS correction data distribution device 10 according to the fourth exemplary embodiment.

FIG. 26B is a view illustrating an example of cartographic information about GPS correction data distribution device 10 according to the fourth exemplary embodiment. In the present exemplary embodiment, for example, pieces of information about areas A2, A3, A4, A5 of the rice field are stored in HDD 14 of GPS correction data distribution device 10.

Figure 26C:
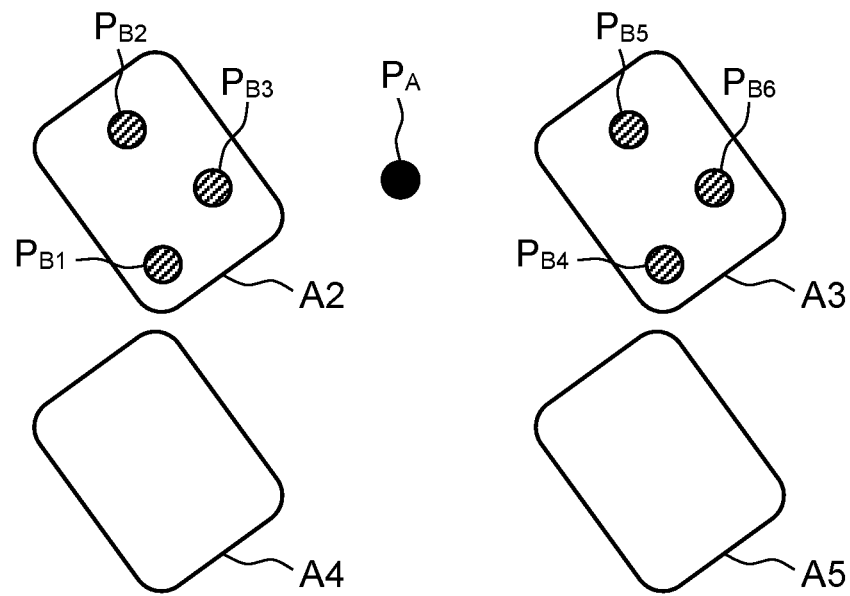
FIG. 26C is a view illustrating an example of the coordinate managed in the first database of GPS correction data distribution device 10 according to the fourth exemplary embodiment, and the position of RTK terminal device 20 and the cartographic information, the position and the cartographic information being managed by the second database.

FIG. 26C is a view illustrating an example of a relationship between positions $P_{B1}$, $P_{B2}$, $P_{B3}$, $P_{B4}$, $P_{B5}$, $P_{B6}$ of the RTK terminal device, positions $P_{B1}$, $P_{B2}$, $P_{B3}$, $P_{B4}$, $P_{B5}$, $P_{B6}$ being managed in second database $14_{D2}$ of GPS correction data distribution device 10 according to the fourth exemplary embodiment, and areas A2, A3, A4, A5 in the cartographic information. As illustrated in FIG. 26C, based on positions $P_{B1}$, $P_{B2}$, $P_{B3}$, $P_{B4}$, $P_{B5}$, $P_{B6}$ of RTK terminal device 20 in second database $14_{D2}$ and areas A2, A3, A4, A5 in the cartographic information, GPS correction data manager 16 obtains work areas A2, A3 of RTK terminal device 20, and decides a midpoint of work areas A2, A3 as new coordinate $P_A$. GPS correction data manager 16 updates first database $14_D$ using decided coordinate $P_A$. Therefore, GPS correction data manager 16 deletes the coordinate other than center coordinate $P_A$ of the coordinates corresponding to positions $P_{B1}$, $P_{B2}$, $P_{B3}$, $P_{B4}$, $P_{B5}$, $P_{B6}$ of RTK terminal device 20 in the coordinate of the GPS correction data in first database $14_D$, the coordinate of the GPS correction data being distributed to RTK terminal device 20 in the past.

Figure 27:
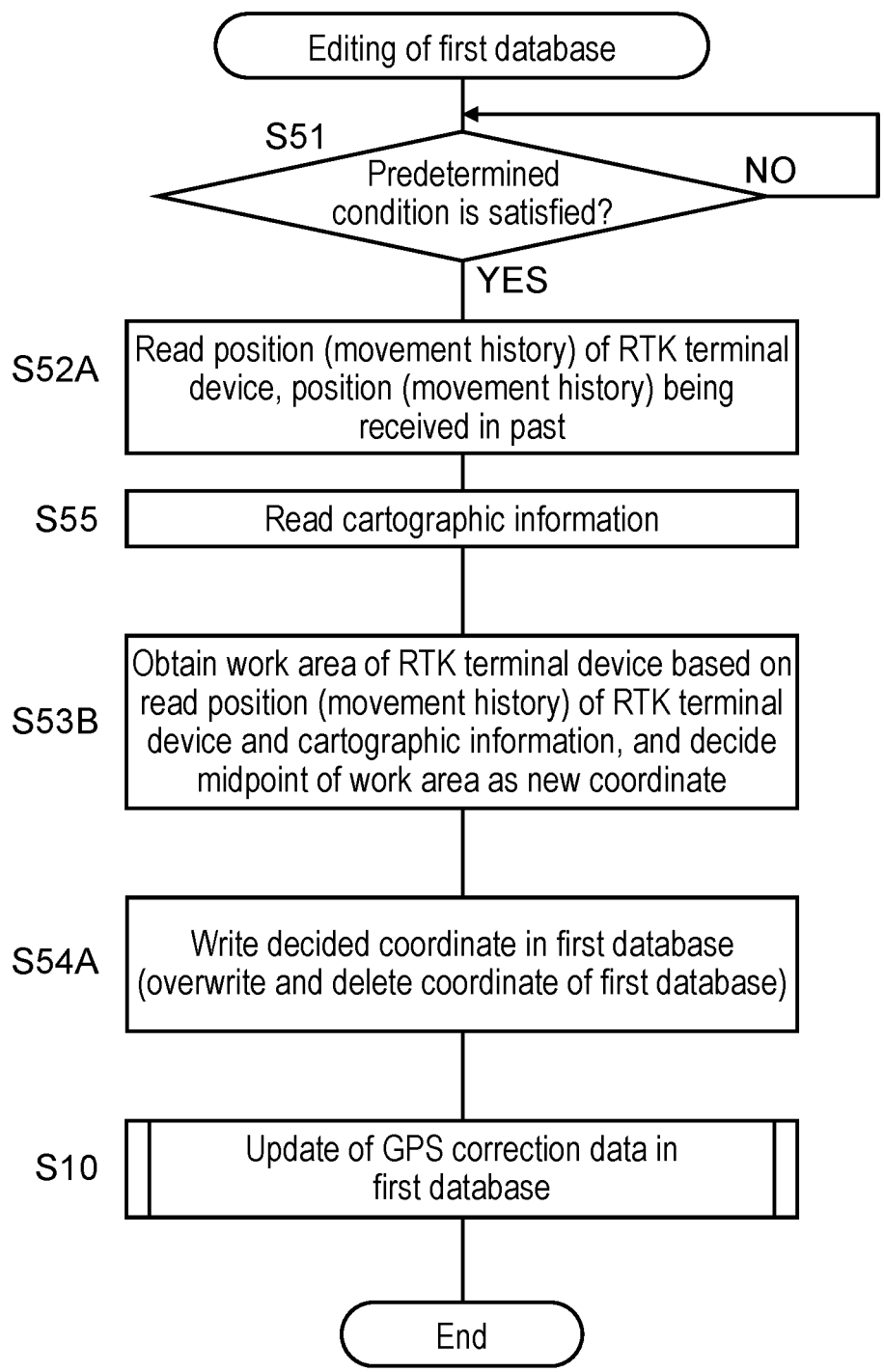
FIG. 27 is a flowchart illustrating the operation to edit the first database using GPS correction data distribution device 10 according to the fourth exemplary embodiment.

FIG. 27 is a flowchart illustrating the operation to edit first database $14_D$ using GPS correction data distribution device 10 according to the fourth exemplary embodiment.

First, the operation in step S51 is performed similarly to FIG. 25. Then, GPS correction data manager 16 refers to second database $14_{D2}$, reads the position (movement history) of RTK terminal device 20, the position being received in the past (S52A), and reads the cartographic information (S55). Then, based on read positions $P_{B1}$, $P_{B2}$, $P_{B3}$, $P_{B4}$, $P_{B5}$, $P_{B6}$ of RTK terminal device 20 and areas A2, A3, A4, A5 in the cartographic information, GPS correction data manager 16 obtains work areas A2, A3 of RTK terminal device 20, and decides the midpoint of work areas A2, A3 as new coordinate $P_A$ (S53B) (see FIG. 26C). Then, the operations in steps S54A and S10 are performed similarly to FIG. 25.

The effect similar to that of the third exemplary embodiment can be obtained in the present exemplary embodiment.

Other Exemplary Embodiments

The first to fourth exemplary embodiments are described above as illustration of the technique disclosed in the present disclosure. However, the technique of the present disclosure is not limited to the first to fourth exemplary embodiments, and is applicable to other exemplary embodiments in which a change, a replacement, an addition, or an omission is appropriately made. A new exemplary embodiment can also be made by a combination of the components described in the first to fourth exemplary embodiments. Accordingly, other exemplary embodiments will be described below.

In the first to fourth exemplary embodiments, the GPS correction data distribution device and GPS correction data distribution system in which the GPS is used are described as examples of the GNSS correction data distribution device and GNSS correction data distribution system in which the GNSS is used. However, the GNSS correction data distribution device and the GNSS correction data distribution system are not limited thereto. In the GNSS correction data distribution device and the GNSS correction data distribution system, the GLONASS may be used, or both the GPS and the GLONASS may be used. For example, in the RTK positioning, both the GPS and the GLONASS may be used in the GNSS correction data distribution device and the GNSS correction data distribution system. The GPS correction data distribution device and GPS correction data distribution system in which the GPS is used are described herein for convenience. However, in the GPS correction data distribution device and the GPS correction data distribution system, the GLONASS may be used in addition to the GPS. In this case, the GPS correction data distribution device obtains the GPS correction data, which includes pieces of information from a GPS satellite and a GLONASS satellite, from the GPS correction data server, and manages the database in which the obtained GPS correction data and the coordinate of the GPS correction data are in association with each other. Upon receipt of the GPS correction data distribution request from the RTK terminal device, the GPS correction data distribution device refers to the database, and distributes the GPS correction data corresponding to the position of the RTK terminal device, the position being included in the GPS correction data distribution request, to RTK terminal device 20.

In the GNSS correction data distribution device and the GNSS correction data distribution system, a QZSS (Quasi-Zenith Satellite System) may be used in addition to the GPS and the GLONASS.

In the first to fourth exemplary embodiments, HDD 14 is described as an example of the storage. However, the storage is not limited thereto. For example, an SSD (Solid State Drive) or a semiconductor memory may be used as the storage.

In the first to fourth exemplary embodiments, the database is described as an example of the GPS correction data information. However, the GPS correction data information is not limited thereto. For example, a file or a table may be used as the GPS correction data information.

In the second exemplary embodiment, as illustrated in FIG. 15, in the initial setting of the GPS correction data, the GPS correction data manager decides coordinate $P_{A3}$ closest to final position $P_{B13}$ in positions $P_{B11}$, $P_{B12}$, $P_{B13}$ of RTK terminal device 20, positions $P_{B11}$, $P_{B12}$, $P_{B13}$ being received at predetermined time intervals (at 5-second intervals) in the preceding session, as the coordinate of the GPS correction data to be distributed. However, the GPS correction data manager is not limited thereto. For example, in the initial setting of the GPS correction data, the GPS correction data manager may decide the coordinate closest to the centroid position in the positions of RTK terminal device 20, the positions being received at predetermined time intervals in the preceding session, as the coordinate of the GPS correction data to be distributed.

In the initial setting of the GPS correction data, the GPS correction data manager may decide the coordinate closest to a final position in the positions of RTK terminal device 20, the positions being received at predetermined time intervals in the preceding session, as the coordinate of the GPS correction data to be distributed. For example, in the agricultural scene, it is expected that the operation to end the connection of RTK terminal device 20 is performed at a position where the user goes out of the rice field. Regarding this point, the GPS correction data manager may obtain a future predicted movement locus of RTK terminal device 20 from a past movement locus, and decide the coordinate corresponding to the final position (position close to the last) of the movement locus of RTK terminal device 20, the final position being the position other than the position of RTK terminal device 20 deviating largely from the predicted movement locus, as the coordinate of the GPS correction data to be distributed.

The GPS correction data manager may decide the coordinate closest to a densest position in the positions of RTK terminal device 20, the positions being received at predetermined time intervals in the preceding session, as the coordinate of the GPS correction data to be distributed. For example, the densest position may be a centroid position in a divided area having a highest number of counts when the received position of RTK terminal device 20 is counted in each divided area while the GPS correction data distribution area is divided into 100-meter-square areas that are adequately small for maximum distance Rmax (for example, about 5 km to about 10 km) between the position of RTK terminal device 20 and the position of the GPS correction data in performing the high-accuracy RTK positioning.

In the second exemplary embodiment, as illustrated in FIG. 11, upon receipt of the GPS correction data distribution request, the GPS correction data manager determines whether the distance between position $P_{B1}$ of RTK terminal device 20 and each of the plurality of coordinates $P_{A1}$, $P_{A2}$, $P_{A3}$, $P_{A4}$ in first database $14_D$ falls within the predetermined range of $R_1-\alpha$ to $R_1+\alpha$ in the initial setting of the GPS correction data. However, the GPS correction data manager is not limited thereto. For example, in the case where the GPS correction data distributed in the preceding session exists when the GPS correction data manager receives the GPS correction data distribution request, the GPS correction data manager does not make the determination of the second exemplary embodiment in the initial setting of the GPS correction data, but may decide coordinate $P_{A3}$ of the GPS correction data as the coordinate of the GPS correction data to be distributed. Therefore, when the accuracy of the RTK positioning is degraded, the user can receive the appropriate GPS correction data by performing the connection again.

Alternatively, in the case where the received position of RTK terminal device 20 in the preceding session exists when the GPS correction data manager receives the GPS correction data distribution request, the GPS correction data manager does not make the determination of the second exemplary embodiment in the initial setting of the GPS correction data, but may decide the coordinate of the GPS correction data to be distributed based on the position of RTK terminal device 20. Therefore, the user can automatically receive the appropriate GPS correction data in the next session.

In the third exemplary embodiment, as illustrated in FIG. 20D, in predetermined area A1 centering on coordinate $P_{A3}$ updated lastly in first database $14_D$, the GPS correction data manager deletes coordinates $P_{A1}$, $P_{A2}$ other than the latest coordinate (the center coordinate) $P_{A3}$ in editing first database $14_D$. However, the GPS correction data manager is not limited thereto. For example, in editing first database $14_D$, the GPS correction data manager may delete the coordinate other than the oldest coordinate (the center coordinate) in predetermined area A1 centering on the coordinate updated oldest in first database $14_D$. Alternatively, for example, the GPS correction data manager may delete the coordinate other than the center coordinate of the coordinates included in predetermined area A1 centering on the coordinate updated latest or oldest.

The GPS correction data manager may perform processing of editing the first database in each of the plurality of predetermined areas A1. In this case, for example, the plurality of predetermined areas A1 are fixed such that adjacent predetermined areas adjoin each other. In each of the plurality of predetermined areas A1, the GPS correction data manager may delete the coordinate other than the coordinate closest to the centroid position of the plurality of coordinates $P_{A1}$, $P_{A2}$, $P_{A3}$.

In the fourth exemplary embodiment, as illustrated in FIG. 24, in editing first database $14_D$, the GPS correction data manager deletes the coordinate other than center coordinate $P_A$ of the coordinates corresponding to positions $P_{B1}$, $P_{B2}$, $P_{B3}$ of RTK terminal device 20 in the positions (movement history) of RTK terminal device 20 received in the past in each RTK terminal device 20. However, the GPS correction data manager is not limited thereto. For example, in editing first database $14_D$, the GPS correction data manager may delete the coordinate other than the coordinate corresponding to the latest position in the positions (movement history) of RTK terminal device 20 received in the past in each RTK terminal device.

The exemplary embodiments have been described above and exemplified as the technique of the present disclosure. The accompanying drawings and detailed description have been provided for this purpose. Accordingly, the components described in the appended drawings and the detailed description include, in order to exemplify the above described technique, not only essential components for solving the problem but also components that are not essential for solving the problem. Therefore, it should not be immediately construed that these components that are not essential are essential even if the components are described in the appended drawings and the detailed description. Since the above described exemplary embodiments are for exemplifying the technique of the present disclosure, various modifications, replacements, additions, and omissions can be made within the scope of the appended claims or their equivalents.

The present disclosure can be applied to the GNSS correction data distribution device, which distributes the GNSS correction data to the RTK terminal device that performs the RTK positioning using the GNSS.

What is claimed is:

1. A GNSS (Global Navigation Satellite System) correction data distribution device configured to distribute GNSS correction data to a terminal device, the terminal device configured to perform real time kinematic positioning using a GNSS, the GNSS correction data distribution device comprising:
    a first communicator configured to communicate with the terminal device;
    a second communicator configured to communicate with a GNSS correction data server;
    a storage configured to store GNSS correction data information, the GNSS correction data information having at least one predetermined coordinate and GNSS correction data in association with each other; and
    a manager configured to manage the GNSS correction data information, wherein the manager is configured to:
        obtain the GNSS correction data from the GNSS correction data server through the second communicator with respect to the predetermined coordinate in the GNSS correction data information, and update the GNSS correction data information while associating the predetermined coordinate with the GNSS correction data, and
        refer to the GNSS correction data information upon receipt of a GNSS correction data distribution request from the terminal device through the first communicator, extract the GNSS correction data of the predetermined coordinate corresponding to a position of the terminal device, and distribute the extracted GNSS correction data to the terminal device.

2. The GNSS correction data distribution device according to claim 1, wherein, upon receipt of the GNSS correction data distribution request, the manager refers to the GNSS correction data information, extracts the GNSS correction data of the coordinate closest to the position of the terminal device, and distributes the extracted GNSS correction data to the terminal device.

3. The GNSS correction data distribution device according to claim 1, wherein
    assuming that one session is a period from start to end of connection between the GNSS correction data distribution device and the terminal device, and
    the manager refers to the GNSS correction data information upon receipt of the GNSS correction data distribution request, extracts the GNSS correction data distributed in a preceding session when a distance between the position of the terminal device and each of a plurality of coordinates in the GNSS correction data information falls within a predetermined range, and distributes the extracted GNSS correction data to the terminal device.

4. The GNSS correction data distribution device according to claim 1, wherein assuming that one session is a period from start to end of connection
    between the GNSS correction data distribution device and the terminal device, the manager refers to the GNSS correction data information upon receipt of the GNSS correction data distribution request, extracts the GNSS correction data based on the position of the terminal device in a preceding session when a distance between the position of the terminal device and each of a plurality of coordinates in the GNSS correction data information falls within a predetermined range, and distributes the extracted GNSS correction data to the terminal device.

5. The GNSS correction data distribution device according to claim 1, wherein the manager refers to the GNSS correction data information upon receipt of the GNSS correction data distribution request, extracts the GNSS correction data based on a movement direction of the terminal device when a distance between the position of the terminal device and each of a plurality of coordinates in the GNSS correction data information falls within a predetermined range, and distributes the extracted GNSS correction data to the terminal device.

6. The GNSS correction data distribution device according to claim 1, wherein, upon receipt of the GNSS correction data distribution request, the manager obtains the GNSS correction data from the GNSS correction data server through the second communicator with respect to a coordinate indicating the position of the terminal device, and updates the GNSS correction data information while associating the coordinate with the GNSS correction data.

7. The GNSS correction data distribution device according to claim 6, wherein the manager decreases a number of coordinates managed in the GNSS correction data information when a predetermined condition is satisfied.

8. The GNSS correction data distribution device according to claim 7, wherein, when the manager deletes a coordinate in the GNSS correction data information, the coordinate to be deleted is
   (i) a coordinate which is outside a predetermined area whose center is at a coordinate which is updated oldest in the GNSS correction data information,
   (ii) a coordinate which is outside a predetermined area whose center is at a coordinate which is updated latest in the GNSS correction data information, or
   (iii) a coordinate which is outside a predetermined area whose center is at centroid of the coordinates in the GNSS correction data information.

9. The GNSS correction data distribution device according to claim 7, wherein the manager deletes, in each terminal device, a coordinate other than
   (i) a latest position in a past position of the terminal device or (ii) a coordinate at the centroid of coordinates related to the terminal device in a coordinate of the GNSS correction data, the coordinate of the GNSS correction data being distributed in the past to the terminal device in the GNSS correction data information.

10. A GNSS (Global Navigation Satellite System) correction data distribution system comprising:
   a terminal device configured to perform real time kinematic positioning using a GNSS; and
   the GNSS correction data distribution device according to claim 1 that is configured to distribute the GNSS correction data to the terminal device.

* * * * *